(12) United States Patent
Futamura et al.

(10) Patent No.: US 9,233,674 B2
(45) Date of Patent: Jan. 12, 2016

(54) TURNING CONTROL DEVICE FOR VEHICLE

(75) Inventors: Tomoyuki Futamura, Utsunomiya (JP);
Takeshi Kojima, Saitama (JP);
Kazutaka Ohmura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/580,798

(22) PCT Filed: Mar. 4, 2011

(86) PCT No.: PCT/JP2011/055038
§ 371 (c)(1),
(2), (4) Date: Aug. 23, 2012

(87) PCT Pub. No.: WO2011/108693
PCT Pub. Date: Sep. 9, 2011

(65) Prior Publication Data
US 2012/0316745 A1 Dec. 13, 2012

(30) Foreign Application Priority Data

Mar. 4, 2010 (JP) .................................. 2010-047833
Dec. 9, 2010 (JP) .................................. 2010-274950

(51) Int. Cl.
*A01B 69/00* (2006.01)
*B62D 6/00* (2006.01)
(Continued)

(52) U.S. Cl.
CPC .................................... *B60T 8/1755* (2013.01)

(58) Field of Classification Search
USPC ..................................................... 701/41, 43
See application file for complete search history.

(56) References Cited

U.S. PATENT DOCUMENTS 5,228,757 A * 7/1993 Ito et al. ........................ 303/146
6,415,215 B1  7/2002 Nishizaki et al.
(Continued)

FOREIGN PATENT DOCUMENTS

CN 1721242 A 1/2006
CN 1721244 A 1/2006
(Continued)

OTHER PUBLICATIONS

EP Search Report, mailed Nov. 7, 2013, issued in corresponding EP application 11750797.0.
(Continued)

*Primary Examiner* — Yonel Beaulieu
*Assistant Examiner* — Lail Kleinman
(74) *Attorney, Agent, or Firm* — Carrier Blackman & Associates, P.C.; Joseph P. Carrier; Anne G. Sabourin

(57) ABSTRACT

A turning control device for a vehicle includes: a first standard yaw rate calculation unit that calculates a first standard yaw rate on the basis of detection signals of the lateral acceleration detection unit and the vehicle speed detection unit, a correction unit that corrects the first standard yaw rate, in an increasing direction on the basis of detection signals of a steering amount detection unit and the vehicle speed detection unit, and calculates a second standard yaw rate, a braking force control amount calculation unit that calculates a yaw rate deviation that is a deviation between the second standard yaw rate and an actual yaw rate, which is detected by the yaw rate detection unit, and determines a braking force control amount so as to cancel out the yaw rate deviation, and a braking control unit that controls the braking force on the basis of the braking force control amount determined by the braking force control amount calculation unit.

13 Claims, 16 Drawing Sheets

(51) Int. Cl.
    *B62D 11/00*     (2006.01)
    *B62D 12/00*     (2006.01)
    *B63G 8/20*     (2006.01)
    *B63H 25/04*     (2006.01)
    *G05D 1/00*     (2006.01)
    *G06F 7/00*     (2006.01)
    *G06F 17/00*     (2006.01)
    *G06F 19/00*     (2011.01)
    *B60T 8/1755*     (2006.01)

(56) References Cited

U.S. PATENT DOCUMENTS

| | | | |
|---|---|---|---|
| 6,453,226 B1 * | 9/2002 | Hac et al. | 701/48 |
| 6,697,726 B2 | 2/2004 | Takagi et al. | |
| 6,708,098 B2 * | 3/2004 | Matsumoto et al. | 701/70 |
| 6,879,890 B2 * | 4/2005 | Matsumoto et al. | 701/23 |
| 7,349,786 B2 | 3/2008 | Takagi | |
| 8,321,088 B2 | 11/2012 | Brown et al. | |
| 2001/0027893 A1 * | 10/2001 | Nishizaki et al. | 180/409 |
| 2003/0074122 A1 * | 4/2003 | Hac | 701/70 |
| 2004/0102887 A1 * | 5/2004 | Lin et al. | 701/70 |
| 2005/0080545 A1 | 4/2005 | Takagi | |
| 2005/0125131 A1 | 6/2005 | Kato et al. | |
| 2005/0209763 A1 * | 9/2005 | Offerle et al. | 701/83 |
| 2005/0236894 A1 | 10/2005 | Lu et al. | |
| 2005/0240332 A1 * | 10/2005 | Mori et al. | 701/72 |
| 2006/0069489 A1 | 3/2006 | Chen et al. | |
| 2006/0091727 A1 | 5/2006 | Motoyama | |
| 2006/0116801 A1 * | 6/2006 | Shirley et al. | 701/36 |
| 2006/0197377 A1 | 9/2006 | Takahashi et al. | |
| 2008/0086248 A1 | 4/2008 | Lu et al. | |
| 2008/0255744 A1 | 10/2008 | Yasui et al. | |
| 2009/0171526 A1 | 7/2009 | Takenaka et al. | |

FOREIGN PATENT DOCUMENTS

| | | | |
|---|---|---|---|
| EP | 1 627 764 A1 | 2/2006 | |
| GB | 2 412 100 A | 9/2005 | |
| JP | 5-024422 A | 2/1993 | |
| JP | 8-048226 A | 2/1996 | |
| JP | 2572860 B2 | 1/1997 | |
| JP | 2000-071961 A | 3/2000 | |
| JP | 2000071961 A * | 3/2000 | B60T 8/24 |
| JP | 2005-153716 A | 6/2005 | |
| JP | 2009-056949 A | 3/2009 | |
| JP | 2009-173104 A | 6/2009 | |
| JP | 2009-173104 A | 8/2009 | |

OTHER PUBLICATIONS

Notice of Allowance issued on Oct. 23, 2013 in co-pending U.S. Appl. No. 13/582,415.

U.S. Office Action, issued in U.S. Appl. No. 13/582,415 on May 14, 2013.

Chinese Office Action with a mailing date of Mar. 31, 2014, issued in the corresponding CN Patent Application 201180008620.4 with the English translation of the Search Report.

Chinese Office Action issued in counterpart CN Patent Application 201180012027.7 and the English translation thereof, with a mailing date of May 8, 2014.

* cited by examiner

TURNING-INCREASING CONTROL

RETURNING CONTROL

TURNING CONTROL DEVICE FOR VEHICLE

TECHNICAL FIELD OF THE INVENTION

The present invention relates to a turning control device for a vehicle that controls turning of a vehicle using braking.

Priority is claimed on Japanese Patent Application No. 2010-047833, filed on Mar. 4, 2010 and Japanese Patent Application No. 2010-274950, filed on Dec. 9, 2010, the contents of which are incorporated herein by reference.

BACKGROUND ART

As an example of this type of turning control device, it is known that stabilization of a vehicle behavior is achieved by controlling braking of a specific wheel in a direction in which a deviation between a lateral G standard yaw rate, which is calculated on the basis of the acceleration of a vehicle in the right-and-left direction (hereinafter referred to as lateral acceleration) and a vehicle speed, and the actual yaw rate of the vehicle is brought close to 0.

Additionally, in an example of another turning control device, it is known that a yaw moment is assisted and improvement of a turning-round property is achieved by controlling to make right and left braking forces of front wheels different and make right and left braking forces of rear wheels different, according to a turning state (for example, the change rate of a steering angle or a steering angle), at braking (for example, refer to Patent Document 1).

Additionally, it is known that improvement of the turning-round property is achieved by calculating a correct yaw moment by adding a first moment and a second moment, the first yaw moment is calculated on the basis of a steering angular speed or a steering angular acceleration, and the second yaw moment is calculated on the basis of the steering angle, the vehicle speed, and the yaw rate, and then making right and left braking forces of front wheels different and making right and left braking forces of rear wheels different so as to generate the corrected yaw moment (for example, refer to Patent Document 2).

PRIOR ART DOCUMENTS

Patent Documents

Patent Document 1: Japanese Patent No. 2572860
Patent Document 2: Japanese Unexamined Patent Application, First Publication No. 2005-153716

SUMMARY OF THE INVENTION

Problems to be Solved by the Invention

However, in the turning control device described in Patent Document 1, the yaw moment is always assisted during turning whilst braking. Thus, a case where the yaw moment becomes excessive and stability decreases is considered, and therefore is not feasible.

On the other hand, in the turning control device described in Patent Document 2, the first yaw moment is greatly reflected at steep turning (when the steering angular speed or the steering angular acceleration is large). At this time, the turning-round property is improved, but the device is not effective at usual turning. Therefore, a turning control device that can improve the turning-round property at usual turning is much needed.

Thus, the invention provides a turning control device for a vehicle that can improve a turning-round property at usual turning.

Means for Solving the Problems

The following measure is adopted in the turning control device for a vehicle related to the invention in order to solve the above problems.

(1) A first aspect of the invention is a turning control device for a vehicle adapted to be capable of generating a yaw moment in a vehicle body by giving a braking force to each of right and left wheels on the basis of the traveling state of a vehicle, the turning control device including: a steering amount detection unit that detects the steering amount of the vehicle; a vehicle speed detection unit that detects or estimates the vehicle speed of the vehicle; a lateral acceleration detection unit that detects the acceleration of the vehicle in the right-and-left direction; a yaw rate detection unit that detects the yaw rate of the vehicle; a first standard yaw rate calculation unit that calculates a first standard yaw rate on the basis of detection signals of the lateral acceleration detection unit and the vehicle speed detection unit; a correction unit that corrects the first standard yaw rate in an increasing direction on the basis of detection signals of the steering amount detection unit and the vehicle speed detection unit, and calculates a second standard yaw rate; a braking force control amount calculation unit that calculates a yaw rate deviation that is the deviation between the second standard yaw rate and an actual yaw rate detected by the yaw rate detection unit, and determines a braking force control amount so as to cancel out the yaw rate deviation; and a braking control unit that controls the braking force on the basis of the braking force control amount determined by the braking force control amount calculation unit.

(2) In the device of the above (1), the correction unit may determine a correction amount so that the second standard yaw rate becomes smaller as the vehicle speed becomes larger.

(3) In the device of the above (1) or (2), the correction unit may select any one of a steering angle yaw rate reference value estimated on the basis of the detection signals of the steering amount detection unit and the vehicle speed detection unit and a delayed steering angle yaw rate value determined corresponding to the steering angle yaw rate reference value and having a time delay with respect to the steering angle yaw rate reference value, and may correct the first standard yaw rate in the increasing direction on the basis of the selected steering angle yaw rate reference value or delayed steering angle yaw rate value, thereby calculating the second standard yaw rate.

(4) The device of the above (1) to (3) may further include a required torque detection unit that detects the magnitude of a required torque on the basis of an accelerator opening degree or an accelerator manipulation amount, and the correction unit may determine the correction amount so that the second standard yaw rate becomes larger as the vehicle speed becomes smaller when the detection signal of the required torque detection unit is smaller than a predetermined value.

(5) In the devices of the above (1) to (4), the correction unit may determine the correction amount so that the second standard yaw rate becomes larger as a turning speed or turning amount calculated on the basis of the detection signal of the steering amount detection unit becomes larger.

(6) The devices of the above (1) to (5) may further include a second braking force control amount calculation unit that determines a second braking force control amount on the basis of detection signals of the steering amount detection unit and the vehicle speed detection unit, and the braking control unit may control the braking force on the basis of a total braking force control amount obtained by adding or multiplying the braking force control amount determined by the braking force control amount calculation unit and the second braking force control amount determined by the second braking force control amount calculation unit.

(7) The device of the above (6) may further include an invalidation section that invalidates the second braking force control amount determined by the second braking force control amount calculation unit in a predetermined operational status.

(8) In the devices of the above (3) to (7), the correction unit may select the delayed steering angle yaw rate value in a case where a steering direction determined on the basis of a detection signal of the steering amount detection unit is a turning-increasing direction, and may select the steering angle yaw rate reference value in a case where the steering direction is a returning direction.

Effect of the Invention

According to the invention of the above (1), the second standard yaw rate is calculated by correcting the first standard yaw rate calculated on the basis of the lateral acceleration and the vehicle speed in the increasing direction, and a braking force is controlled so that a yaw moment can be generated in the direction in which the yaw rate deviation between the second standard yaw rate and an actual yaw rate is cancelled out. For this reason, even at usual turning, the turning-round property is improved and the response of steering is improved.

According to the invention of the above (2), the stability of the vehicle behavior can be prevented from declining in a high-speed region.

According to the invention of the above (3), the response of steering can be changed when the steering wheel is increased in turning and the steering wheel is returned.

According to the invention of the above (4), the turning-round property at a tuck-in where the vehicle speed is a low or middle speed is improved.

According to the invention of the above (5), the response of steering at an avoiding operation from a front obstacle or a lane change is improved.

According to the invention of the above (6), the response of steering is improved, and the followability is improved. For example, like during steady-state circle turning, a change in the control amount is suppressed and the followability is improved, in the process of steering holding after a steering input.

According to the invention of the above (7), if the second braking force control amount is added, the second braking force control amount can be invalidated under specific conditions in which the stability of the vehicle behavior may decline, for example at a high vehicle speed, at a high turning speed, or at an ABS operation, or the like. For this reason, the stability of the vehicle behavior can be maintained.

According to the invention of the above (8), approach to a natural control response can be made by suppressing excessive control intervention when the steering wheel is increased in turning. A response can be improved by reducing a time delay when the steering wheel is returned.

DESCRIPTION OF EMBODIMENTS

Hereinafter, respective embodiments of a turning control device for a vehicle related to the invention will be described with reference to the drawings of FIGS. 1 to 19.

Embodiment 1

First, Embodiment 1 of the turning control device for a vehicle related to the invention will be described with reference to the drawings of FIGS. 1 to 9.

Figure 1:
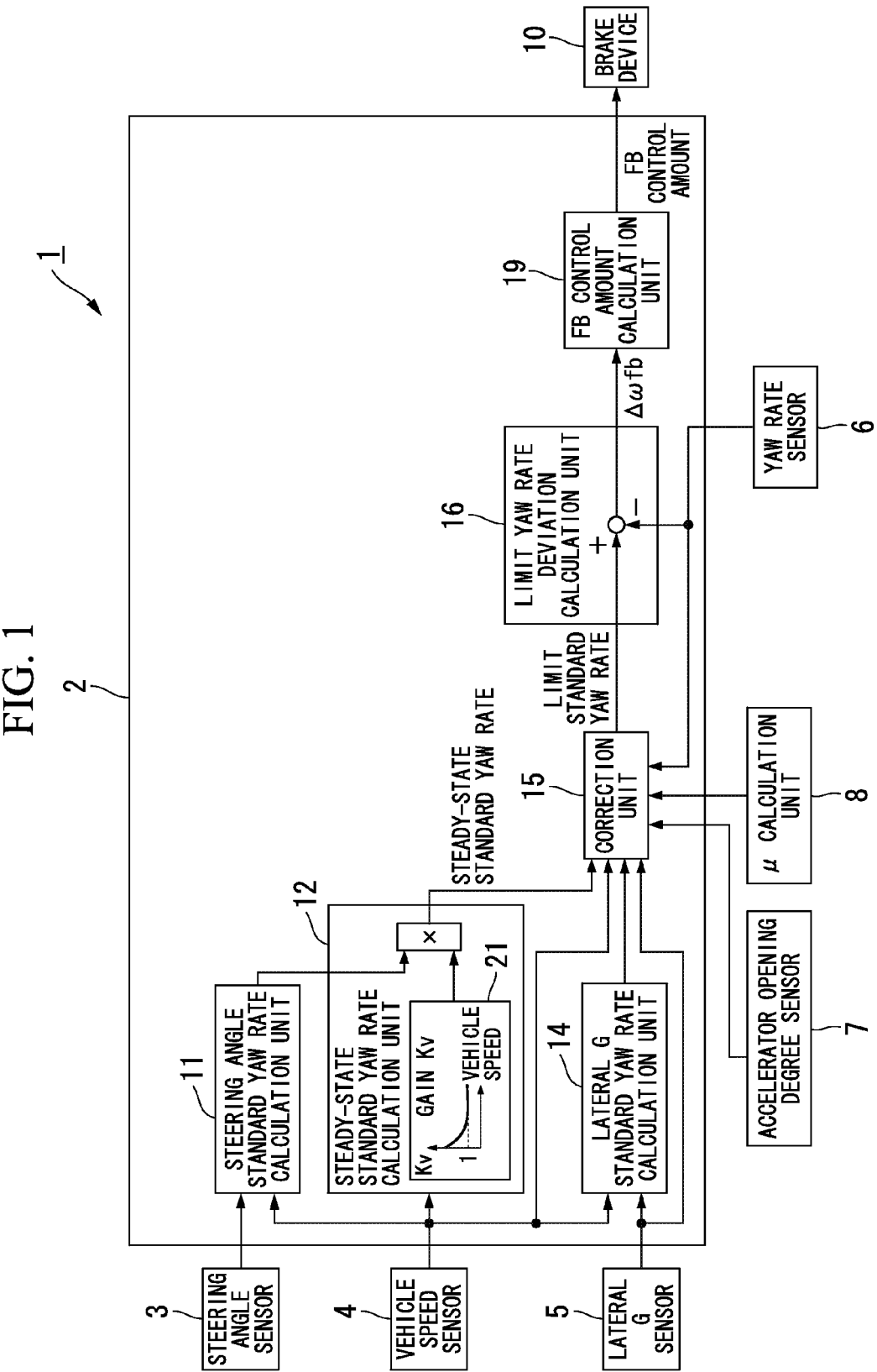
FIG. 1 is a control block diagram in Embodiment 1 of a turning control device for a vehicle related to the invention.

FIG. 1 is a control block diagram in the turning control device for a vehicle of Embodiment 1.

The turning control device 1 for a vehicle includes a brake control unit 2 and a brake device 10 (braking control unit).

The brake control unit 2 determines the braking force control amounts of front, rear, right, and left wheels according to the traveling state of a vehicle. The brake device 10 controls the braking force of each wheel on the basis of the braking force control amount of each wheel determined by the brake control unit 2.

Detection signals according to detection values are input to the brake control unit 2, respectively, from a steering angle sensor 3 (steering amount detection unit) that detects the steering angle (steering amount) of a steering wheel of the vehicle, a vehicle speed sensor 4 (vehicle speed detection unit) that detects a vehicle speed, a lateral acceleration sensor (hereinafter abbreviated as a lateral G sensor) 5 that detects the acceleration of the vehicle in a right-and-left direction (vehicle width direction), that is, lateral acceleration (hereinafter abbreviated as a lateral G), a yaw rate sensor 6 (yaw rate detection unit) that detects the yaw rate of the vehicle, and an accelerator opening degree sensor 7 (required torque detection unit) that detects the accelerator opening degree of the vehicle. Additionally, an electrical signal according to a calculated frictional coefficient is input to the brake control unit 2 from a μ calculation unit 8 that calculates the frictional coefficient between the wheel of the vehicle and a road surface.

The brake control unit 2 includes a steering angle standard yaw rate calculation unit 11, a steady-state standard yaw rate calculation unit 12, a lateral G standard yaw rate calculation unit 14 (first standard yaw rate calculation unit), a correction unit 15, a limit yaw rate deviation calculation unit 16, and a feedback control amount calculation unit 19 (hereinafter abbreviated as an FB control amount calculation unit).

Figure 2:
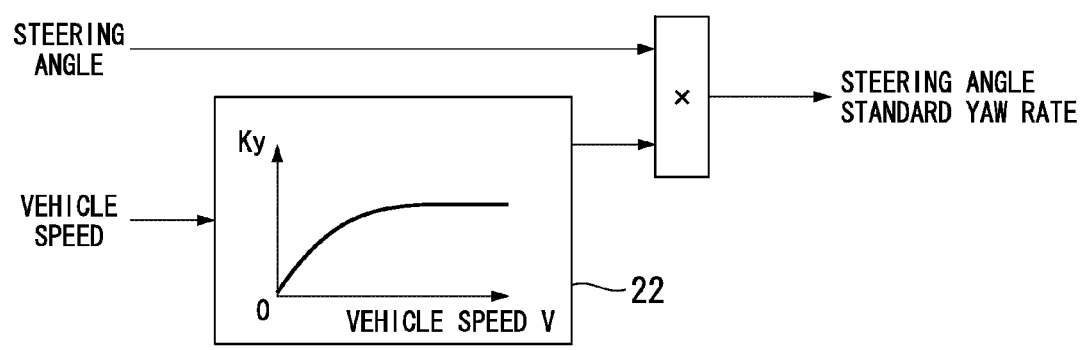
FIG. 2 is a block diagram of steering angle standard yaw rate calculation.

The steering angle standard yaw rate calculation unit 11 estimates and calculates a steering angle standard yaw rate on the basis of the steering angle detected by the steering angle sensor 3 and the vehicle speed detected by the vehicle speed sensor 4. Specifically, as shown in FIG. 2, the steering angle standard yaw rate is calculated by obtaining a steering angle standard yaw rate gain Ky according to the vehicle speed with reference to a steering angle standard yaw rate gain table 22 and multiplying the steering angle detected by the steering angle sensor 3 by the steering angle standard yaw rate gain Ky. In addition, in the steering angle standard yaw rate gain table 22, the horizontal axis represents the vehicle speed and the vertical axis represents the steering angle standard yaw rate gain Ky. The steering angle standard yaw rate gain table 22 can be experimentally obtained in consideration of tire characteristics. The steering angle standard yaw rate gain table 22 in Embodiment 1 is nonlinear, and as the vehicle speed becomes larger, the steering angle standard yaw rate gain Ky becomes larger, and converges on a predetermined value. Since the steering angle is increased when a driver wants to turn the vehicle positively, the steering angle standard yaw rate becomes larger. That is, when a steering angle standard yaw rate calculated on the basis of a steering angle is large, the steering intention of the driver who wants to turn the vehicle can be estimated to be large.

The steady-state standard yaw rate calculation unit 12 calculates a steady-state standard yaw rate gain Kv according to the vehicle speed with reference to the steady-state standard yaw rate gain table 21, and calculates a steady-state standard yaw rate $\omega\_high$ by multiplying the steering angle standard yaw rate by the steady-state standard yaw rate gain Kv. In the steady-state standard yaw rate gain table 21 in Embodiment 1, the horizontal axis represents the vehicle speed and the vertical axis represents the steady-state standard yaw rate gain Kv. The steady-state standard yaw rate gain Kv converges on 1 as the vehicle speed becomes larger, and the steady-state standard yaw rate gain Kv becomes larger as the vehicle speed becomes smaller. In Embodiment 1, the steady-state standard yaw rate $\omega\_high$ constitutes a correction reference value, and the steady-state standard yaw rate $\omega\_high$ has a higher gain as the vehicle speed becomes lower.

The lateral G standard yaw rate calculation unit 14 calculates a lateral G standard yaw rate $\omega\_low$ (first standard yaw rate) on the basis of the lateral G detected by the lateral G sensor 5 (lateral acceleration detection unit), and the vehicle speed detected by the vehicle speed sensor 4. The lateral G standard yaw rate $\omega\_low$ is a yaw rate that can be generated at an existing G, for example, expressed by $\omega\_low=Gy/V$. Here, Gy is a lateral acceleration detection value detected by the lateral G sensor 5, and V is the vehicle body speed detected by the vehicle speed sensor 4.

The correction unit 15 calculates a limit standard yaw rate $\omega\_TAR$ (second standard yaw rate) on the basis of the steady-state standard yaw rate $\omega\_high$ and the lateral G standard yaw rate $\omega\_low$. A calculation method of the limit standard yaw rate $\omega\_TAR$ in the correction unit 15 will be described below in detail.

The limit yaw rate deviation calculation unit 16 subtracts the yaw rate (actual yaw rate) detected by the yaw rate sensor 6 from the limit standard yaw rate $\omega\_TAR$, and calculates the limit yaw rate deviation $\Delta\omega fb$.

The FB control amount calculation unit 19 (braking force control amount calculation unit) calculates a feedback control amount (hereinafter abbreviated as an FB control amount) on the basis of the limit yaw rate deviation $\Delta\omega b$, and outputs the feedback control amount to the brake device 10 as a command value.

Next, the calculation method of the limit standard yaw rate $\omega\_TAR$ in the correction unit 15 will be described with reference to the drawing of FIGS. 3 to 8.

Figure 3:
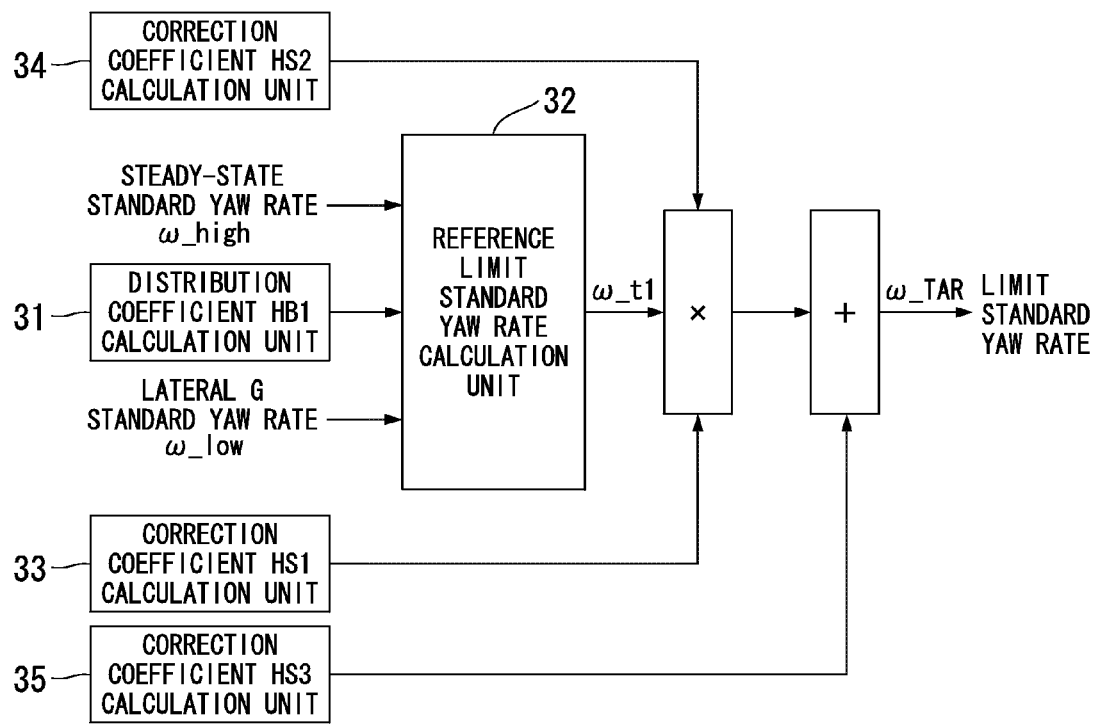
FIG. 3 is a block diagram of a correction unit in Embodiment 1.

As shown in FIG. 3, the correction unit 15 includes a distribution coefficient HB1 calculation unit 31, a reference limit standard yaw rate calculation unit 32, a correction coefficient HS1 calculation unit 33, a correction coefficient HS2 calculation unit 34, and a correction coefficient HS3 calculation unit 35.

In the reference limit standard yaw rate calculation unit 32 of the correction unit 15, a reference limit standard yaw rate $\omega\_t1$ is calculated on the basis of the distribution coefficient HB1 calculated by the distribution coefficient HB1 calculation unit 31, the steady-state standard yaw rate $\omega\_high$, and the lateral G standard yaw rate $\omega\_low$. Moreover, the limit standard yaw rate $\omega\_TAR$ is calculated by multiplying the reference limit standard yaw rate $\omega\_t1$ by correction coefficients HS1 and HS2 calculated by the correction coefficient HS1 calculation unit 33 and the correction coefficient HS2 calculation unit 34, and adding a correction coefficient HS3 calculated by the correction coefficient HS3 calculation unit 35.

$$\omega\_TAR=\omega\_t1\times HS1\times HS2+HS3 \qquad \text{Formula (1)}$$

This limit standard yaw rate $\omega\_TAR$ is a yaw rate target value in feedback control.

In feedback control in related-art steering assisting brake control, the lateral G standard yaw rate $\omega\_low$ was adopted as a target value. The reference limit standard yaw rate calculation unit 32 of this embodiment associates the lateral G standard yaw rate $\omega\_low$ with the steady-state standard yaw rate $\omega\_high$ calculated on the basis of the steering angle, corrects the lateral G standard yaw rate in the increasing direction, and calculates the reference limit standard yaw rate $\omega\_t1$. This achieves the compatibility between the control of stabilizing a yaw moment generated in a vehicle body and the control of improving the response of steering.

Figure 4:
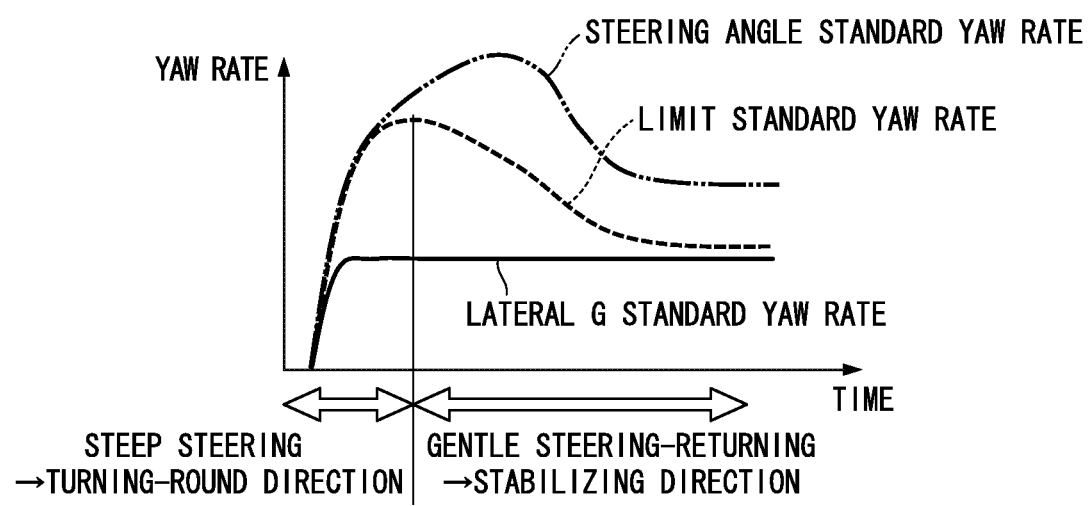
FIG. 4 is a view describing the relationship among a lateral G standard yaw rate, a steering angle standard yaw rate, and a limit standard yaw rate.

Here, increasing correction of the lateral G standard yaw rate will be described with reference to FIG. 4. FIG. 4 shows temporal changes in the steering angle standard yaw rate and the lateral G standard yaw rate until the steering wheel is rotated from a straight-ahead state and is held at a predetermined steering angle. In this way, usually, the steering angle standard yaw rate is larger than the lateral G standard yaw rate. Thus, as a method of increasing and correcting the lateral G standard yaw rate, the lateral G standard yaw rate is corrected so as to be brought close to the steering angle standard yaw rate. In this case, how much the lateral G standard yaw rate is brought close to the steering angle standard yaw rate was adjusted according to a traveling state, and the concept of the distribution coefficient of the lateral G standard yaw rate and the steering angle standard yaw rate was adopted for the adjusting measure.

In Embodiment 1, as a method of further developing and increasing and correcting the lateral G standard yaw rate, the correction was made so as to be brought close to the steady-state standard yaw rate ω_high calculated on the basis of the steering angle standard yaw rate.

In detail, in Embodiment 1, the reference limit standard yaw rate ω_t1 is calculated from Formula (2) on the basis of the distribution coefficient HB1 calculated by the distribution coefficient HB1 calculation unit 31, the lateral G standard yaw rate ω_low, and the steady-state standard yaw rate ω_high.

$$\omega\_t1 = HB1 \times \omega\_high + (1-HB1) \times \omega\_low \qquad \text{Formula (2)}$$

Here, the distribution coefficient HB1 is a numerical value of 0 to 1. In a case of HB1=0, the reference limit standard yaw rate ω_t1 is equal to the lateral G standard yaw rate ω_low. In a case of HB1=1, the reference limit standard yaw rate ω_t1 is equal to the steady-state standard yaw rate ω_high.

Next, the distribution coefficient HB1 calculated in the distribution coefficient HB1 calculation unit 31 will be described with reference to FIG. 5.

The distribution coefficient HB1 is calculated by multiplying a distribution coefficient HB1a calculated according to the vehicle speed, a distribution coefficient HB1b calculated according to a yaw rate change rate, a distribution coefficient HB1c calculated according to yaw rate deviation integration, and a distribution coefficient HB1d calculated according to a turning speed.

$$HB1 = HB1a \times HB1b \times HB1c \times HB1d \qquad \text{Formula (3)}$$

Figure 5:
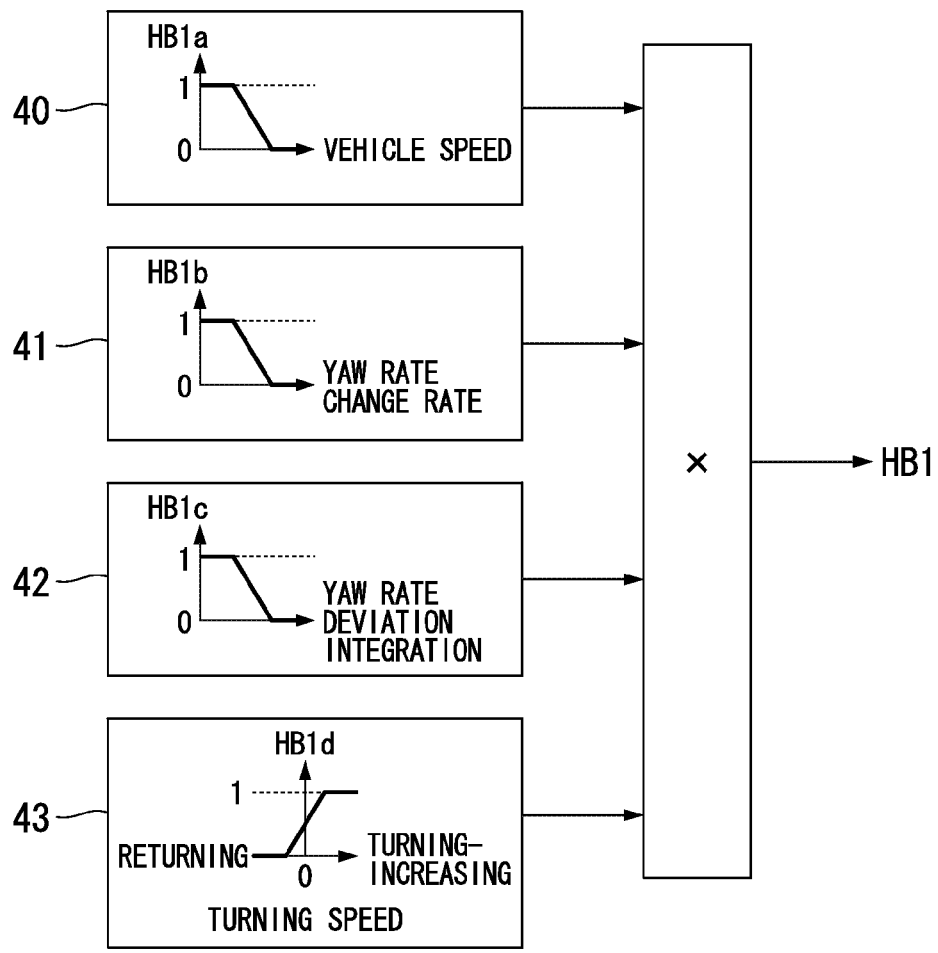
FIG. 5 is a view describing a calculation method of a distribution coefficient HB1 in Embodiment 1.

The respective distribution coefficient HB1a, HB1b, HB1c, and HB1d are calculated with reference to distribution coefficient tables 40, 41, 42, and 43 shown in FIG. 5, respectively. The respective distribution coefficient tables 40, 41, 42, and 43 in Embodiment 1 will be described.

In the distribution coefficient table 40 from which the distribution coefficient HB1a is calculated, the horizontal axis represents the vehicle speed and the vertical axis represents the distribution coefficient HB1a. In the distribution coefficient table 40, HB1a=1, which is constant, is established in a low vehicle speed region, the distribution coefficient HB1a becomes gradually smaller as the vehicle speed becomes higher in a region where the vehicle speed is within a predetermined range, and HB1a=0, which is constant, is established in a high-speed region. Thereby, when the vehicle speed is low, a turning-round property and followability can be improved by increasing the limit standard yaw rate ω_TAR that becomes a target value in the FB control amount calculation unit 19. When the vehicle speed is high, the stability of a vehicle behavior can be secured by keeping the limit standard yaw rate ω_TAR that becomes a target value in the FB control amount calculation unit 19 from increasing.

In the distribution coefficient table 41 from which the distribution coefficient HB1b is calculated, the horizontal axis represents the yaw rate change rate, and the vertical axis represents the distribution coefficient HB1b. In the distribution coefficient table 41, HB1b=1, which is constant, is established in a region where the yaw rate change rate is small, the distribution coefficient HB1b becomes gradually smaller as the yaw rate change rate becomes larger in a region where the yaw rate change rate is within a predetermined range, and HB1b=0, which is constant, is established in a region where the yaw rate change rate is large. Here, the yaw rate change rate is a temporal change in the actual yaw rate detected by the yaw rate sensor 6, and can be calculated by time-differentiating the actual yaw rate. For example, when severe slalom traveling is performed or when the vehicle behavior is unstable, a large yaw rate change rate appears. Since the limit standard yaw rate ω_TAR that becomes a target value in the FB control amount calculation unit 19 should not be made large in such a case, when the yaw rate change rate is large, the distribution coefficient HB1b is set to a small value so as not to increase the limit standard yaw rate ω_TAR.

In the distribution coefficient table 42 from which the distribution coefficient HB1c is calculated, the horizontal axis represents a yaw rate deviation integration value and the vertical axis represents the distribution coefficient HB1c. In the distribution coefficient table 42, HB1c=1, which is constant, is established in a region where the yaw rate deviation integration value is small, the distribution coefficient HB1c becomes gradually smaller as the yaw rate deviation integration value becomes larger in a region where the yaw rate deviation integration value is within a predetermined range, and HB1c=0, which is constant, is established in a region where the yaw rate deviation integration value is large. Here, the yaw rate deviation integration value is a value obtained by integrating the deviation between the limit standard yaw rate and the actual yaw rate detected by the yaw rate sensor 6, that is, the limit yaw rate deviation Δωfb, from when steering is started. For example, even if the limit yaw rate deviation Δωfb is small, the yaw rate deviation integration value becomes larger in a case where the state continues for a long time. In such a case, since the vehicle may be gradually brought into a spin state although slow, the limit standard yaw rate ω_TAR that becomes a target value in the FB control amount calculation unit 19 should not be made large. Thus, when the yaw rate deviation integration value is large, the distribution coefficient HB1c is set to a small value so as not to increase the limit standard yaw rate ω_TAR.

In the distribution coefficient table 43 from which the distribution coefficient HB1d is calculated, the horizontal axis represents the turning speed and the vertical axis represents the distribution coefficient HB1d.

In the distribution coefficient table 43, the distribution coefficient HB1d become larger as the turning speed becomes larger, and the distribution coefficient HB1d in a case where the turning speed is positive is set to become larger than that in a case where the turning speed is negative. Here, the turning speed is a value determined on the basis of the temporal change amount of the steering angle detected by the steering angle sensor 3 and the steering angle, and can be calculated by time-differentiating the steering angle and comparing with the steering angle. The cases where the turning speed is positive are when the temporal change amount of the steering angle in a direction apart from a neutral position (straight-ahead direction position) has occurred in a state where the steering wheel is rotationally operated in the same direction and when the temporal change amount of the steering angle to the neutral position (the straight-ahead direction position) has occurred in the state where the steering wheel is rotationally operated in the same direction. The cases where the turning speed is negative are when the temporal change amount of the steering angle has occurred in the direction turned to the neutral position in a direction where the steering wheel is rotationally operated in the direction apart from the neutral position (straight-ahead direction position) and when the temporal change amount of the steering angle has occurred in the direction apart from the neutral position in a state where the steering wheel is rotationally operated in a direction in which the steering wheel is returned to the neutral position.

In addition, the turning speed may be defined as positive in a state where the steering wheel is rotationally operated in the direction apart from the neutral position, and the turning speed may be defined as negative in a state where the steering wheel is rotationally operated to the neutral position.

Since it can be estimated that the operation intention of the driver who wants to turn the vehicle greatly is large in the cases where the turning speed is positive, the distribution coefficient HB1$d$ is set to a larger value as the turning speed becomes larger (maximum is HB1$d$=1, which is constant) so that the limit standard yaw rate ω_TAR become larger. This improves the response of steering. On the other hand, since it can be estimated that the cases where the turning speed is negative are a state where the driver wants to converge operation, the distribution coefficient HB1$d$ is set to a smaller value as the turning speed becomes smaller (the minimum is HB1$d$=0, which is constant) so as not to increase the limit standard yaw rate ω_TAR.

This improves the response of steering, for example, at an avoiding operation from a front obstacle or a lane change.

In addition, the distribution coefficient HB1$d$ may be calculated on the basis of the turning angle (turning amount) instead of the turning speed. This is because it can be estimated that the operation intention of the driver who wants to turn the vehicle positively becomes larger as the turning angle becomes larger. The turning angle in this case is synonymous with the steering angle.

Next, the correction coefficient HS1 calculated in the correction coefficient HS1 calculation unit 33 will be described with reference to FIG. 6.

The correction coefficient HS1 is a correction coefficient obtained, for example, by supposing the time when the driver turns the steering wheel with the vehicle as a front load, thereby performing the operation of turning the vehicle.

Figure 6:
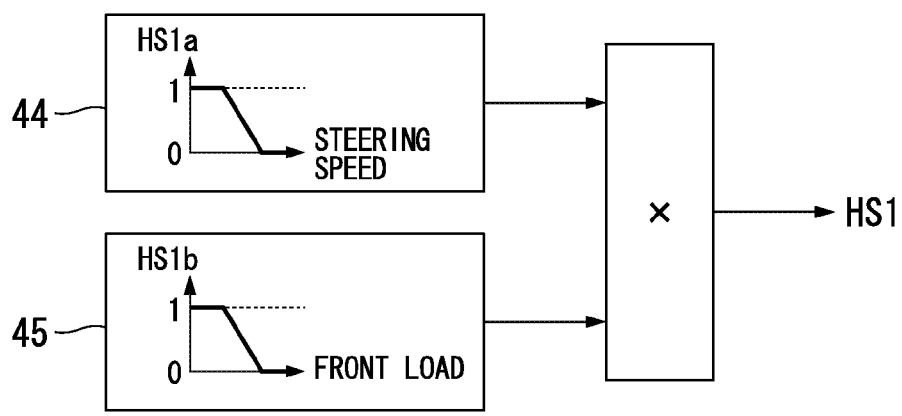
FIG. 6 is a view describing a calculation method of a correction coefficient HS1 in Embodiment 1.

As shown in FIG. 6, the correction coefficient HS1 is calculated by multiplying the correction coefficient HS1$a$ calculated according to the steering speed by a correction coefficient HS1$b$ calculated according to the front load of the vehicle.

$$HS1=HS1a \times HS1b \quad \text{Formula (4)}$$

The front load of the vehicle is the movement amount of load to the front of the vehicle, for example, can be estimated on the basis of a longitudinal acceleration sensor (not shown) that detects the acceleration of the vehicle in the front-and-rear direction. In this case, the longitudinal acceleration sensor can be said to be a load movement amount estimation unit that estimates a load movement amount in the front-and-rear direction.

The respective correction coefficients HS1$a$ and HS1$b$ are calculated with reference to the correction coefficient tables 44 and 45 shown in FIG. 6, respectively. The correction coefficient tables 44 and 45 in Embodiment 1 will be described.

In the correction coefficient table 44 from which the correction coefficient HS1$a$ is calculated, the horizontal axis represents the steering speed and the vertical axis represents the correction coefficient HS1$a$. In the correction coefficient table 44, HS1$a$=1, which is constant, is established in a region where the steering speed is small, the correction coefficient HS1$a$ becomes gradually smaller as the steering speed becomes larger in a region where the steering speed is within a predetermined range, and HS1$a$=0, which is constant, is established in a region where the steering speed is large.

In the correction coefficient table 45 from which the correction coefficient HS1$b$ is calculated, the horizontal axis represents the front load (load movement amount to the front of the vehicle), and the vertical axis represents the correction coefficient HS1$b$. In the correction coefficient table 45, HS1$b$=1, which is constant, is established in a region where the front load is small, the correction coefficient HS1$b$ becomes gradually smaller as the front load becomes larger in a region where the front load is within a predetermined range, and HS1$b$=0, which is constant, is established in a region where the front load is large.

If the steering wheel is turned with the vehicle as a front load as mentioned above, the vehicle is easily turned. However, the vehicle behavior is likely to be unstable as the front load becomes larger, and the vehicle behavior is likely to be unstable as the steering speed becomes larger. The correction coefficient HS1 is a correction coefficient for adjusting the limit standard yaw rate ω_TAR at such steering.

As a result of calculating the correction coefficient HS1 as described above, the correction coefficient HS1 becomes 1 in the region where the steering speed is small and in the region where the front load is small. Thus, the limit standard yaw rate ω_TAR can be increased, and the turning-round property can be improved. In contrast, since the correction coefficient HS1 becomes smaller than 1 as the steering speed and the front load become larger, the limit standard yaw rate ω_TAR can be made small, and the stability of the vehicle behavior can be secured.

Next, the correction coefficient HS2 calculated in the correction coefficient HS2 calculation unit 34 will be described.

The correction coefficient HS2 is a correction coefficient supposing a case where a lane change (the operation of performing steering to return to an original traveling direction immediately) is made on a road surface (hereinafter abbreviated as a high μ road) with a high frictional coefficient (hereinafter abbreviated as μ) between the vehicle wheel and the road surface.

The correction coefficient HS2 is a gain configured so as to subtract a predetermined decreasing counting value from an initial value in a case where the following conditions are satisfied with 1 as the maximum value, and so as to add a predetermined increasing counting value toward 1 in a case where neither of the following conditions are satisfied. As the conditions, (a) when the frictional coefficient μ is determined to be high (or when a longitudinal or lateral acceleration corresponding to traveling on a road surface run with a high frictional coefficient is detected), (b) when the steering angle is determined to be large, (c) when a lateral G decreasing rate is determined to be large, and (d) when a yaw rate decreasing rate is determined to be large, the predetermined decreasing counting value is subtracted. In addition, the above conditions may be at least one of (a) to (d) or arbitrary combinations of a plurality thereof. Particularly when vehicle behavior convergence performance at a high frictional coefficient is taken into consideration, it is preferable to use combinations of the above (a) and any of the above (b) to (d).

In addition, the frictional coefficient μ is calculated by the μ calculation unit 8. Additionally, the lateral G decreasing rate is the decreasing rate of the lateral G, can be calculated on the basis of the lateral G detected by the lateral G sensor 5, and the yaw rate decreasing rate is the decreasing rate of the actual yaw rate detected by the yaw rate sensor 6.

Figure 7:
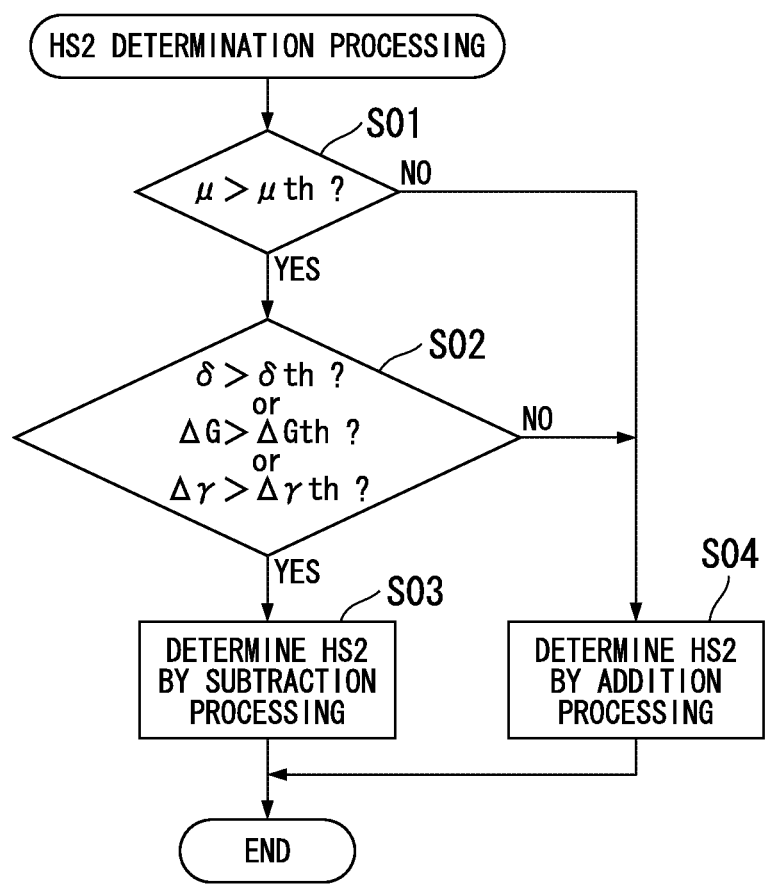
FIG. 7 is a flowchart showing determination processing of a correction coefficient HS2 in Embodiment 1.

According to a flowchart of FIG. 7, an example of the processing of determining the correction coefficient HS2 will be described.

First, in Step S01, it is determined whether or not the frictional coefficient μ is larger than a threshold μth.

If the determination result in Step S01 is "YES" (μ>μth), the processing proceeds to Step S02 and where it is determined whether or not at least one of whether the steering angle δ is larger than a threshold δth (δ>δth), whether the lateral G decreasing rate δG is larger than a threshold δGth (ΔG>δGth), and whether the yaw rate decreasing rate γ is larger than a threshold γth (γ>γth) is satisfied.

If the determination result in Step S02 is "YES", the processing proceeds to Step S03 where the correction coefficient HS2 is changed by subtraction processing, and execution of this routine is once ended. This subtraction processing subtracts a predetermined subtraction counting value from the initial value of the correction coefficient HS2 so that the correction coefficient HS2 converges on 0.

On the other hand, if the determination result in Step S01 is "NO" (μ≤μth), and if the determination result in Step S02 is "NO", the processing proceeds to Step S04 where the correction coefficient HS2 is changed by addition processing, and execution of this routine is once ended. This addition processing adds a predetermined increasing counting value so that the correction coefficient HS2 converges on 1.

In addition, the initial value of correction coefficient HS2 is a predetermined value between 0 and 1.

In a case where the yaw rate and the lateral G decrease abruptly when a lane change is performed on the high μ road, a large yaw rate may be generated in a direction reverse to a direction in which the driver wants to travel through steering. At this time, if the limit standard yaw rate ω_TAR is increased, there is a possibility that the tracking performance of the vehicle to steering may deteriorate. The correction coefficient HS2 is a coefficient for suppressing this. That is, in a case where the frictional coefficient μ, the steering angle, the lateral G decreasing rate, and the yaw rate decreasing rate are large, the correction coefficient HS2 is set to a small value so as not to increase the limit standard yaw rate ω_TAR, and thereby, the convergence performance of the yaw rate after a lane change is improved.

Next, the correction coefficient HS3 calculated in the correction coefficient HS3 calculation unit 35 will be described with reference to FIG. 8.

The correction coefficient HS3 is a correction coefficient obtained, for example, by supposing a case where the driver has performed a tuck-in. The tuck-in is a phenomenon in which the vehicle becomes a front load and enters the turning inner side when an accelerator is suddenly allowed to return during turning, and the driver may actively use the tuck-in to perform a turning operation. However, if the turning operation is performed using this tuck-in when an accelerator is opened from the time when a required torque to the vehicle is large (in other words, when the accelerator opening degree is large), or when the vehicle speed is large, the vehicle behavior is likely to be unstable. The correction coefficient HS3 is a correction coefficient for adjusting the limit standard yaw rate ω_TAR at a tuck-in.

Figure 8:
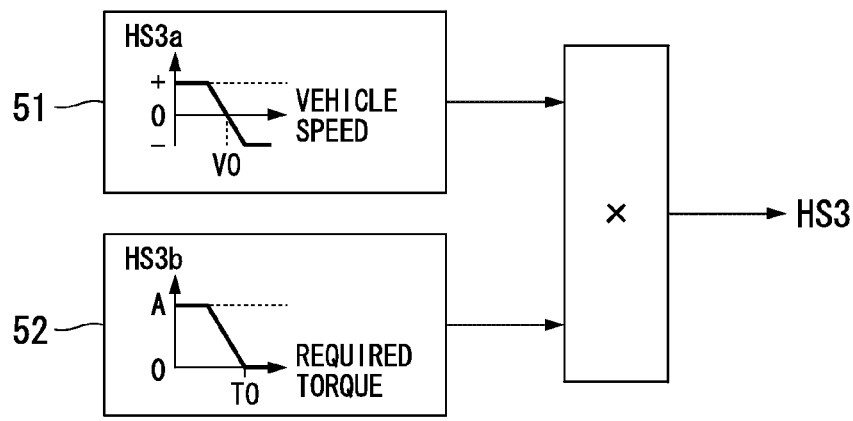
FIG. 8 is a view describing a calculation method of a correction coefficient HS3 in Embodiment 1.

As shown in FIG. 8, the correction coefficient HS3 is calculated by multiplying a correction coefficient HS3a calculated according to the vehicle speed by a correction coefficient HS3b calculated according to the required torque of the vehicle.

$$HS3 = HS3a \times HS3b \qquad \text{Formula (5)}$$

In addition, the required torque of the vehicle can be calculated from the accelerator opening degree detected by the accelerator opening degree sensor 7.

The respective correction coefficient HS3a and HS3b are calculated with reference to the correction coefficient tables 51 and 52 shown in FIG. 8, respectively. The correction coefficient tables 51 and 52 in Embodiment 1 will be described.

In the correction coefficient table 51 from which the correction coefficient HS3a is calculated, the horizontal axis represents the vehicle speed and the vertical axis represents the correction coefficient HS3a. In the correction coefficient table 51, HS3a is a positive constant value in a region where the vehicle speed is smaller than a predetermined value, the correction coefficient HS3a becomes gradually smaller as the vehicle speed becomes larger and becomes a negative value if the vehicles speed exceeds a predetermined speed V0, in a region where the vehicle speed is within a predetermined range, and the HS3a becomes a negative constant value in a region where the vehicle speed is larger than the predetermined range.

In the correction coefficient table 52 from which the correction coefficient HS3b is calculated, the horizontal axis represents the required torque of the vehicle and the vertical axis represents the correction coefficient HS3b. In the correction coefficient table 52, HS3b is a positive value in a region where the required torque is smaller than a predetermined value T0, and the correction coefficient HS3b=0 is established in a region where the required torque is equal to or larger than the predetermined value T0. Here, the predetermined value T0 is a very small value, for example, is set to a corresponding required torque when the accelerator opening degree is close to zero.

By setting the correction coefficient tables 51 and 52 in this way, the correction coefficient HS3 is set to 0 irrespective of the magnitude of the vehicle speed in a case where the required torque is equal to or larger than the predetermined value T0 (that is, when it is determined that the vehicle speed is not in a tuck-in state). As a result, the limit standard yaw rate ω_TAR can be prevented from being corrected.

Additionally, in a case where the required torque is equal to or smaller than the predetermined value T0 (that is, when it is determined that the vehicle speed is in a tuck-in state), the correction coefficient HS3 becomes a positive value when the vehicle speed is smaller than V0. Thus, the limit standard yaw rate ω_TAR can be increased. On the other hand, since the correction coefficient HS3 becomes a negative value when the vehicle speed is equal to or larger than V0, the limit standard yaw rate ω_TAR can be made small. Moreover, when the required torque is the same in a case where the vehicle speed is smaller than V0, the correction coefficient H3 is set to a large positive value as the vehicle speed becomes smaller, so that the limit standard yaw rate ω_TAR can be further increased. This can improve the turning-round property at a tuck-in where the vehicle speed is a low or middle speed. On the other hand, when the required torque is the same in a case where the vehicle speed is equal to or larger than V0, the correction coefficient H3 is set to a large negative value as the vehicle speed becomes larger, so that the limit standard yaw rate ω_TAR can be made small.

Figure 9:
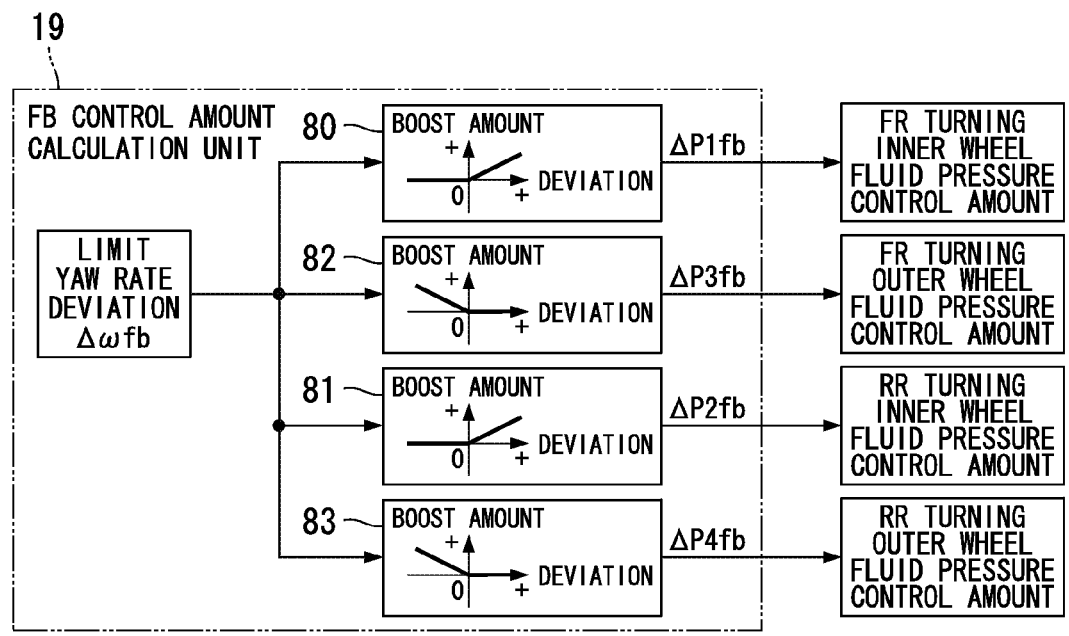
FIG. 9 is a block diagram of braking force control amount calculation in Embodiment 1.

Next, the calculation of the brake control amount (hereinafter referred to as an FB control amount) executed in the FB control amount calculation unit 19 will be described with reference to FIG. 9.

In the FB control amount calculation unit 19 calculates an FB boost amount ΔP1fb of a turning inner wheel on the front wheel side (hereinafter abbreviated as an FR turning inner wheel), an FB boost amount ΔP3fb of a turning outer wheel on the front wheel side (referred to as an FR turning outer wheel), an FB boost amount ΔP2fb of a turning inner wheel on the rear wheel side (hereinafter abbreviated as a RR turning inner wheel), and an FB boost amount ΔP4fb of a turning outer wheel on the rear wheel side (hereinafter referred to as an RR turning outer wheel) are calculated on the basis of the limit yaw rate deviation $\Delta\omega fb$ calculated by the limit yaw rate deviation calculation unit 16. In addition, as a subsequent turning direction, a case where the sign of the deviation $\Delta\omega fb$ is positive, and both the standard yaw rate and the actual yaw rate are positive will be described as an example.

The FB boost amount $\Delta P1fb$ of the FR turning inner wheel is calculated with reference to a boost amount table 80 on the basis of the limit yaw rate deviation $\Delta\omega fb$. In the boost amount table 80, the horizontal axis represents the limit yaw rate deviation $\Delta\omega fb$ and the vertical axis represents the FB boost amount $\Delta P1fb$. In Embodiment 1, the FB boost amount $\Delta P1fb$ is 0 in a case where the limit yaw rate deviation $\Delta\omega fb$ is equal to or smaller than 0, and the FB boost amount $\Delta P1fb$ increases as the limit yaw rate deviation $\Delta\omega fb$ becomes larger in a case where the limit yaw rate deviation $\Delta\omega fb$ is equal to or larger than 0.

The FB boost amount $\Delta P2fb$ of the RR turning inner wheel is calculated with reference to a boost amount table 81 on the basis of the limit yaw rate deviation $\Delta\omega fb$. In the boost amount table 81, the horizontal axis represents the limit yaw rate deviation $\Delta\omega fb$ and the vertical axis represents the FB boost amount $\Delta P2fb$. In Embodiment 1, the FB boost amount $\Delta P2fb$ is 0 in a case where the limit yaw rate deviation $\Delta\omega fb$ is equal to or smaller than 0, and the FB boost amount $\Delta P2fb$ increases as the limit yaw rate deviation $\Delta\omega fb$ becomes larger in a case where the limit yaw rate deviation $\Delta\omega fb$ is equal to or larger than 0.

The FB boost amount $\Delta P3fb$ of the FR turning outer wheel is calculated with reference to a boost amount table 82 on the basis of the limit yaw rate deviation $\Delta\omega fb$. In the boost amount table 82, the horizontal axis represents the limit yaw rate deviation $\Delta\omega fb$ and the vertical axis represents the FB boost amount $\Delta P3fb$. In Embodiment 1, the FB boost amount $\Delta P3fb$ is 0 in a case where the limit yaw rate deviation $\Delta\omega fb$ is equal to or larger than 0, and the FB boost amount $\Delta P3fb$ increases as the absolute value of the limit yaw rate deviation $\Delta\omega fb$ becomes larger in a case where the limit yaw rate deviation $\Delta\omega fb$ is equal to or smaller than 0.

The FB boost amount $\Delta P4fb$ of the RR turning outer wheel is calculated with reference to a boost amount table 83 on the basis of the limit yaw rate deviation $\Delta\omega fb$. In the boost amount table 83, the horizontal axis represents the limit yaw rate deviation $\Delta\omega fb$ and the vertical axis represents the FB boost amount $\Delta P4fb$. In Embodiment 1, the FB boost amount $\Delta P4fb$ is 0 in a case where the limit yaw rate deviation $\Delta\omega fb$ is equal to or larger than 0, and the FB boost amount $\Delta P4fb$ increases as the absolute value of the limit yaw rate deviation $\Delta\omega fb$ becomes larger in a case where the limit yaw rate deviation $\Delta\omega fb$ is equal to or smaller than 0.

That is, in the FB control amount calculation unit 19, the actual yaw rate is smaller than the limit standard yaw rate in a case where the limit yaw rate deviation $\Delta\omega fb$ is equal to or larger than 0. In this case, the FB control amount of each wheel is set in a direction in which the yaw rate is increased (in other words, in a direction in which the limit yaw rate deviation $\Delta\omega fb$ is cancelled out). Specifically, the FB boost amount is set in a direction in which the brake fluid pressures of the FR turning inner wheel and the RR turning inner wheel are increased, and the FB boost amount is set so that brake fluid pressures of the FR turning outer wheel and the RR turning outer wheel are not increased.

On the other hand, the actual yaw rate is larger than the limit standard yaw rate in a case where the limit yaw rate deviation $\Delta\omega fb$ is equal to or smaller than 0. In this case, the FB control amount of each wheel is set in a direction in which the yaw rate is decreased (in other words, in a direction in which the limit yaw rate deviation $\Delta\omega fb$ is cancelled out). Specifically, the FB boost amount is set in a direction in which the brake fluid pressures of the FR turning outer wheel and the RR turning outer wheel are increased, and the FB boost amount is set so that brake fluid pressures of the FR turning inner wheel and the RR turning inner wheel are not increased.

The FB control amount calculation unit 19 outputs the FB boost amount $\Delta P1fb$ of the FR turning inner wheel, the FB boost amount $\Delta P2fb$ of the RR turning inner wheel, the FB boost amount $\Delta P3fb$ of the FR turning outer wheel, and the FB boost amount $\Delta P4fb$ of the RR turning outer wheel to the brake device 10.

The brake device 10 controls the braking pressure of each wheel according to the input control amount of each wheel.

According to the turning control device for a vehicle of Embodiment 1, the correction unit 15 corrects the lateral G standard yaw rate $\omega\_low$ in an increasing direction in association with the steady-state standard yaw rate $\omega\_high$ calculated on the basis of the steering angle, and calculates the limit standard yaw rate $\omega\_TAR$. For this reason, the control of stabilizing a yaw moment generated in the vehicle body and the control of improving the response of steering can be made compatible. As a result, a driver's turning intention is reflected with high response, and the sense of steering is improved.

Additionally, the lateral G standard yaw rate $\omega\_low$ is corrected in the increasing direction so as to be used as the limit standard yaw rate $\omega\_TAR$, the target value in the FB control amount calculation unit 19 can be increased, and the turning-round property is improved. This enables the vehicle to be turned along a traveling road, and consequently, the road surface following performance (tracking performance) is improved.

Embodiment 2

Next, Embodiment 2 of the turning control device for a vehicle related to the invention will be described with reference to the drawings of FIGS. 10 and 11.

Figure 10:
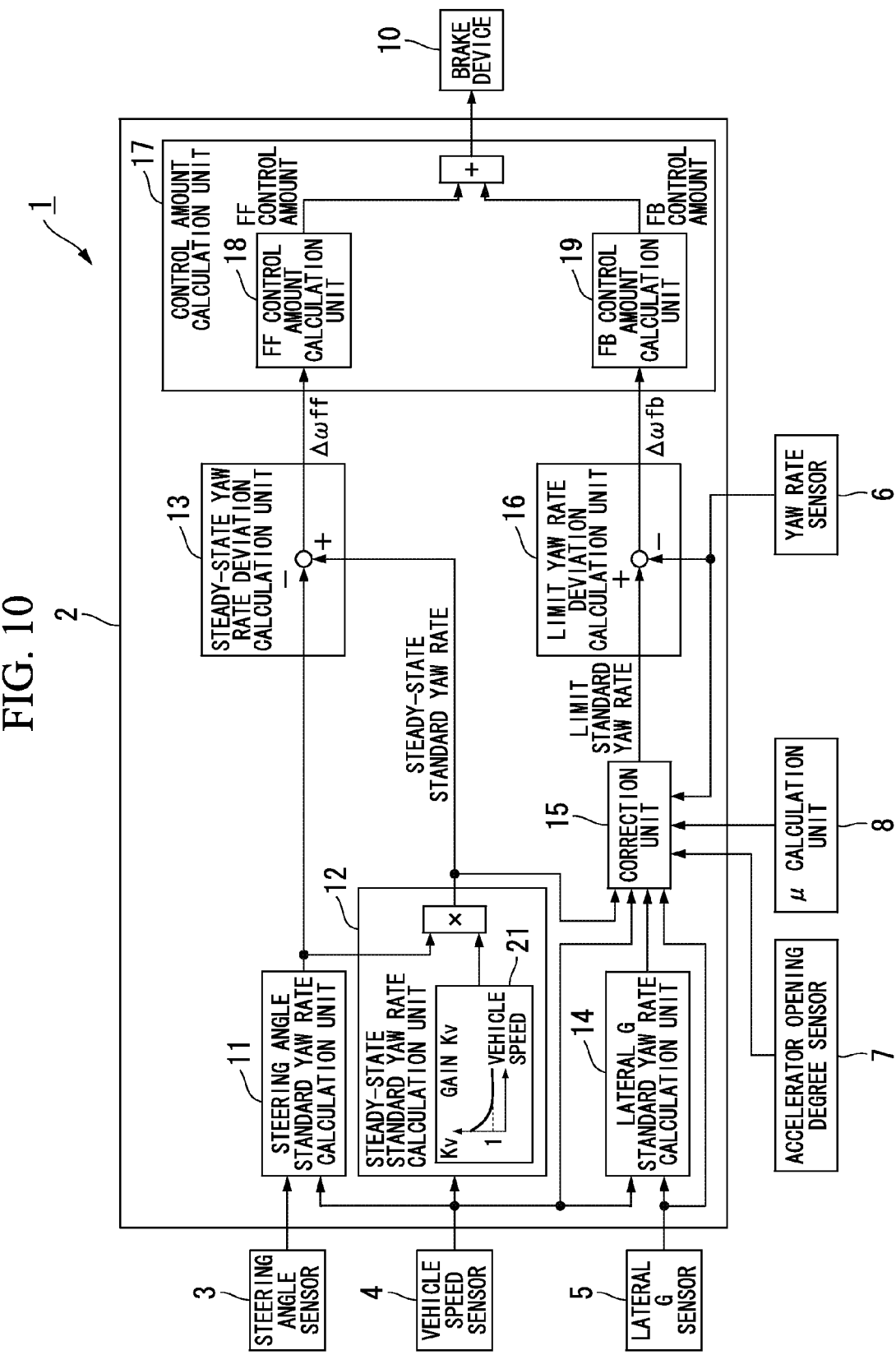
FIG. 10 is a control block diagram in Embodiment 2 of the turning control device for a vehicle related to the invention.

FIG. 10 is a control block diagram in the turning control device for a vehicle of Embodiment 2. In the turning control device for a vehicle of Embodiment 1 mentioned above, the control amount (FB control amount) is obtained in a direction in which the deviation (that is, the limit yaw rate deviation $\Delta\omega fb$) between the limit standard yaw rate $\omega\_TAR$ and the actual yaw rate is cancelled out so that control braking pressure is controlled using only this FB control amount. On the other hand, in the turning control device of Embodiment 2, a feedforward control amount (hereinafter abbreviated as an FF control amount) is calculated on the basis of the steering angle and the vehicle speed, a value obtained by adding the FB control amount and the FF control amount is used as a total control amount, and the braking pressure of each wheel is controlled on the basis of this total control amount.

Although the turning control device for a vehicle of Embodiment 2 will be described below, in the control block diagram of FIG. 10, the feedback control system, that is, the steering angle standard yaw rate calculation unit 11, the steady-state standard yaw rate calculation unit 12, the lateral G standard yaw rate calculation unit 14, the correction unit 15, the limit yaw rate deviation calculation unit 16, and the FB control amount calculation unit 19 are the same as those of Embodiment 1. Thus, the same aspect portions will be designated by the same reference numerals, and the description thereof will be omitted, and the feedforward control system that is different from Embodiment 1 will mainly be described.

The turning control device 1 for a vehicle in Embodiment 2 includes a steady-state yaw rate deviation calculation unit 13 and a feedforward control amount calculation unit 18 (hereinafter abbreviated as an FF control amount calculation unit), as a feedforward control system, in addition to the configuration of the turning control device 1 for a vehicle of Embodiment 1. The control amount calculation unit 17 is constituted by the FF control amount calculation unit 18 (second braking force control amount calculation unit) and the FB control amount calculation unit 19 in Embodiment 1.

The steering angle standard yaw rate from which noise is removed by performing temporal change amount smoothing processing, peak hold processing, or the like on the steering angle standard yaw rate calculated by the steering angle standard yaw rate calculation unit 11 is input to the steady-state yaw rate deviation calculation unit 13. The steady-state yaw rate deviation calculation unit 13 subtracts the steering angle standard yaw rate after the noise removal from steady-state standard yaw rate $\omega\_high$, and calculates a steady-state yaw rate deviation $\Delta\omega ff$.

The FF control amount calculation unit 18 of the control amount calculation unit 17 calculates the FF control amount on the basis of the steady-state yaw rate deviation $\Delta\omega ff$. The FB control amount calculation unit 19 calculates the FB control amount on the basis of the limit yaw rate deviation $\Delta\omega fb$. The control amount calculation unit 17 calculates a total control amount by adding the FF control amount and FB control amount, and outputs the total control amount to the brake device 10 as a command value.

Next, a brake control amount operation performed in the control amount calculation unit 17 will be described with reference to FIG. 11.

The calculation of the FF control amount in the FF control amount calculation unit 18 will be described.

First, the boost distribution to the FR turning inner wheel and the RR turning inner wheel is determined on the basis of the steering angle detected by the steering angle sensor 3. On the basis of the boost distribution, a boost coefficient $K1fr$ for the FR turning inner wheel and a boost coefficient $K1rr$ for the RR turning inner wheel are calculated. Here, in a case where the load movement caused by steering is large, the boost coefficient $K1fr$ for the FR turning inner wheel may be set to become larger according to the steering angle.

Calculation of an FF boost amount $\Delta P1ff$ for the FR turning inner wheel and calculation of an FF boost amount $\Delta P2ff$ for the RR turning inner wheel are performed in parallel on the basis of the boost coefficient $K1fr$ for the FR turning inner wheel and the boost coefficient $K1rr$ for the RR turning inner wheel.

First, the calculation of the FF boost amount $\Delta P1ff$ for the FR turning inner wheel will be described. A steady-state yaw rate deviation $\Delta\omega 1ff$ for the FR turning inner wheel is calculated by multiplying the steady-state yaw rate deviation $\Delta\omega ff$ which is calculated by the steady-state yaw rate deviation calculation unit 13 by the increasing coefficient $K1fr$.

Next, a brake fluid pressure boost amount $\Delta P1ffk$ of the FR turning inner wheel is calculated according to the steady-state yaw rate deviation $\Delta\omega 1ff$ for the FR turning inner wheel with reference to the boost amount table 60. In the boost amount table 60, the horizontal axis represents the steady-state yaw rate deviation $\Delta\omega 1ff$ and the vertical axis represents the brake fluid pressure boost amount $\Delta P1ffk$. In Embodiment 2, the brake fluid pressure boost amount $\Delta P1ffk$ is 0 in a case where the steady-state yaw rate deviation $\Delta\omega 1fr$ for the FR turning inner wheel is equal to or smaller than 0, and the brake fluid pressure boost amount $\Delta P1ffk$ increases as the steady-state yaw rate deviation $\Delta\omega 1ff$ becomes larger in a case where the steady-state yaw rate deviation $\Delta\omega 1ff$ for the FR turning inner wheel is equal to or larger than 0.

Next, in a limit-processing unit 61, limit processing is performed so that the brake fluid pressure boost amount $\Delta P1ffk$ of the FR turning inner wheel does not exceed an upper limit. This upper limit is any value calculated by the upper limit calculation unit 62, and a sudden change in the fluid pressure boost amount $\Delta P1ffk$ is suppressed by being set so as not to exceed this upper limit.

Next, the FR boost amount $\Delta P1ff$ for the FR turning inner wheel is calculated by multiplying the brake fluid pressure boost amount $\Delta P1ffk$ of the FR turning inner wheel subjected to the limit processing by a gain according to the vehicle speed. In addition, the gain according to the vehicle speed is calculated on the basis of a gain table 63. In the gain table 63, the horizontal axis represents the vehicle speed and the vertical axis represents the gain. Gain=1, which is constant, is established in a case where the vehicle speed is small, the gain becomes gradually smaller as the vehicle speed becomes larger in a region where the vehicle speed is within a predetermined range, and gain=0, which is constant, is established in a region where the vehicle speed is large.

As a result of multiplying the gain according to the vehicle speed in this way, the FF boost amount $\Delta P1ff$ of the FR turning inner wheel becomes 0 when the vehicle speed is large. In other words, the FF boost amount $\Delta P1ff$ of the FR turning inner wheel is invalidated at a high vehicle speed. This can prevent the vehicle behavior from becoming unstable due to steering-assisted braking at a high vehicle speed. In Embodiment 2, the gain table 63 constitutes an invalidation section. In addition, instead of multiplying the gain according to the vehicle speed, a limiting value that becomes lower at a higher vehicle speed may be given, and $\Delta P1ff$ may be set so as not to exceed this limiting value.

Since the calculation of the FF boost amount $\Delta P2ff$ for the RR turning inner wheel is the same as the calculation of the FF boost amount $\Delta P1ff$ for the FR turning inner wheel, simple descriptions will be made.

A steady-state yaw rate deviation $\Delta\omega 2ff$ for the RR turning inner wheel is calculated by multiplying the steady-state yaw rate deviation $\Delta\omega ff$ which is calculated by the steady-state yaw rate deviation calculation unit 13 by the increasing coefficient $K1rr$ for the RR turning inner wheel.

Next, a brake fluid pressure boost amount $\Delta P2ffk$ of the RR turning inner wheel is calculated according to the steady-state yaw rate deviation $\Delta\omega 2ff$ for the RR turning inner wheel with reference to the boost amount table 64. Since the boost amount table 64 is the same as the boost amount table 60, the description thereof is omitted.

Next, in a limit-processing unit 65, limit processing is performed so that the brake fluid pressure boost amount $\Delta P2ffk$ of the RR turning inner wheel does not exceed an upper limit. The upper limit is calculated by an upper limit calculation unit 66. The upper limit calculation unit 66 is the same as the upper limit calculation unit 62.

Next, the FF boost amount $\Delta P2ff$ for the RR turning inner wheel is calculated by multiplying the brake fluid pressure boost amount $\Delta P2ffk$ of the RR turning inner wheel subjected to the limit processing by the gain which is calculated from the gain table 67. Since the gain table 67 is the same as the gain table 63, the description thereof is omitted. In Embodiment 2, the gain table 67 constitutes an invalidation section.

Additionally, the FF control amount calculation unit 18 includes an inner wheel pressure reduction amount calculation unit 70. The inner wheel pressure reduction amount calculation unit 70 limits the brake fluid pressure of a turning inner wheel in advance under the premise that the vehicle behavior becomes unstable due to braking at a high speed and a high lateral G.

In the inner wheel pressure reduction amount calculation unit 70, a pressure reduction rate according to the vehicle speed is calculated with reference to a first pressure reduction rate table 71, a pressure reduction rate according to the lateral G is calculated with reference to a second pressure reduction rate table 72, and a total pressure reduction rate is calculated by multiplying these pressure reduction rates.

In the first pressure reduction rate table 71, the horizontal axis represents the vehicle speed and the vertical axis represents the pressure reduction rate. Pressure reduction rate=0, which is constant, is established in a case where the vehicle speed is small, the pressure reduction rate becomes gradually larger as the vehicle speed becomes larger in a region where the vehicle speed is within a predetermined range, and pressure reduction rate=1, which is constant, is established in a region where the vehicle speed is large.

In the second pressure reduction rate table 72, the horizontal axis represents the lateral G and the vertical axis represents the pressure reduction rate. Pressure reduction rate=0, which is constant, is established in a case where the lateral G is small, the pressure reduction rate becomes gradually larger as the lateral G becomes larger in a region where the lateral G is within a predetermined range, and pressure reduction rate=1, which is constant, is established in a region where the lateral G is large.

Thereby, the total pressure reduction rate is set to the value between 0 and 1 according to the vehicle speed and the lateral G during traveling.

The total pressure reduction rate obtained in this way is multiplied by the master cylinder pressure of the brake device 10 and is multiplied by −1 to obtain an inner wheel pressure reduction amount ΔPd.

Since the calculation of the FB control amount in the FB control amount calculation unit 19 is the same as that of Embodiment 1, the description thereof is omitted.

The control amount calculation unit 17 calculates the total control amount of each wheel as follows, and outputs the total control amount to the brake device 10. A value obtained by adding the FF boost amount ΔP1*ff* of the FR turning inner wheel, the FB boost amount ΔP1*fb* of the FR turning inner wheel, and the inner wheel pressure reduction amount ΔPd is defined as a total control amount for the FR turning inner wheel. A value obtained by adding the FF boost amount ΔP2*ff* of the RR turning inner wheel, the FB boost amount ΔP2*fb* of the RR turning inner wheel, and the inner wheel pressure reduction amount ΔPd is defined as a total control amount for the RR turning inner wheel. The FB boost amount ΔP3*fb* of the FR turning outer wheel is defined as the total control amount of the FR turning outer wheel. The FB boost amount ΔP4*fb* of the RR turning outer wheel is defined as the total control amount of the RR turning outer wheel.

The brake device 10 controls the braking pressure of each wheel according to the control amount of each input wheel.

According to the turning control device for a vehicle of Embodiment 2, similar to the case of Embodiment 1, the correction unit 15 corrects the lateral G standard yaw rate ω_low in an increasing direction in association with the steady-state standard yaw rate ω_high on the basis of the steering angle, and calculates the limit standard yaw rate ω_TAR. Accordingly, the control of stabilizing a yaw moment generated in the vehicle body and the control of improving the response of steering can be made compatible. As a result, a driver's turning intention is reflected with high response, and the sense of steering is improved.

Additionally, the lateral G standard yaw rate ω_low is corrected in the increasing direction so as to be used as the limit standard yaw rate ω_TAR, the target value in the FB control amount calculation unit 19 can be increased, and the turning-round property is improved. This enables the vehicle to be turned along a traveling road, and consequently, the road surface following performance (tracking performance) is improved.

Moreover, according to the turning control device for a vehicle of Embodiment 2, braking pressure is controlled on the basis of the total control amount obtained by adding the FF control amount calculated on the basis of a steering input to the FB control amount calculated on the basis of the body behavior. Accordingly, the response of steering can be improved while securing the stability of the vehicle behavior. Additionally, the followability of steering is also improved. For example, in the process of steering holding after a steering input, like during steady-state circle turning, a change in the control amount is suppressed and the followability is improved.

Embodiment 3

Next, Embodiment 3 of the turning control device for a vehicle related to the invention will be described with reference to the drawings of FIGS. 12 to 15.

In the aforementioned Embodiment 1, the steady-state standard yaw rate ω_high is calculated by multiplying the steering angle standard yaw rate by the gain (steady-state standard yaw rate gain Kv) which is set according to the vehicle speed, the steady-state standard yaw rate ω_high is input to the correction unit 15, and the lateral G standard yaw rate ω_low is corrected in association with the steady-state standard yaw rate ω_high according to the steering state or motional state of the vehicle.

Incidentally, it is well known that there is a time delay in the yaw response of a steering input in the vehicle. However, the time delay is not taken into consideration in the steering angle standard yaw rate. Thus, in Embodiment 3, the steering angle standard yaw rate is used as a reference value, a steering angle standard yaw rate in which a time delay is taken into consideration about this reference value is calculated, any one of the steering angle standard yaw rate in which a time delay is not taken into consideration and the steering angle standard yaw rate in which a time delay is taken into consideration is selected according to the steering state of the vehicle, the selected steering angle standard yaw rate is input to the correction unit 15 as the steady-state standard yaw rate ω_high, and the lateral G standard yaw rate ω_low is corrected.

Figure 12:
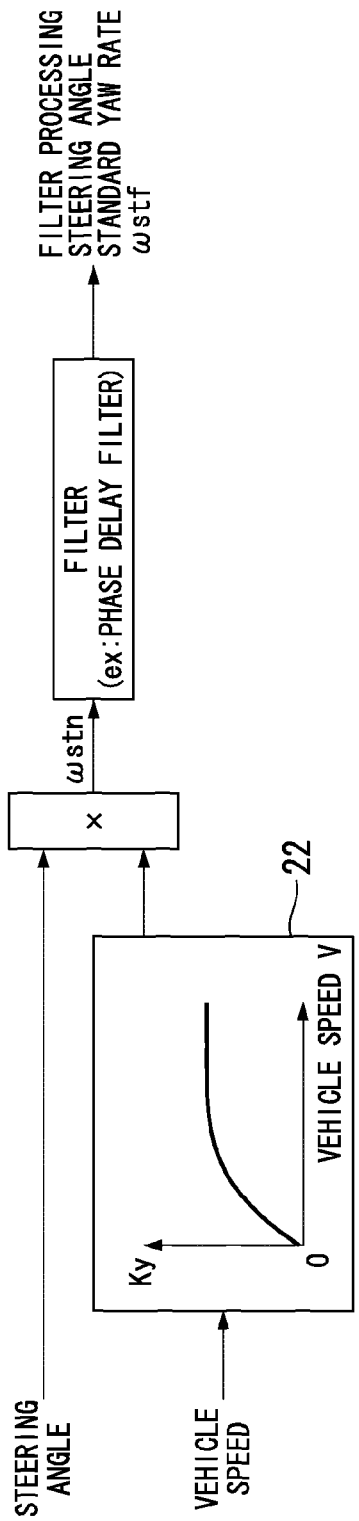
FIG. 12 is a block diagram of filter processing steering angle standard yaw rate calculation.

First, a calculation method of the steering angle standard yaw rate in which a time delay is taken into consideration will be described with reference to FIG. 12.

As described in Embodiment 1 the steering angle standard yaw rate in which a time delay is not taken into consideration is obtained by multiplying the steering angle which is detected by the steering angle sensor 3 by the steering angle standard yaw rate gain Ky determined according to the vehicle speed. The steering angle standard yaw rate in which a time delay is taken into consideration is calculated by performing time delay processing on the steering angle standard yaw rate obtained in this way by a preset time constant, using a phase lag filter 23. When the steering angle standard yaw rate value in which a time delay is not taken into consideration is γstr(t) and the time constant is T, a steering angle standard yaw rate value γstr_flt in which a time delay is taken into consideration is expressed by Formula (7).

$$\gamma str\_flt = \gamma str(t-T) \qquad \text{Formula (7)}$$

In addition, in the following description, the steering angle standard yaw rate in which a time delay is not taken into consideration is simply referred to as a "steering angle standard yaw rate ωstn", and the steering angle standard yaw rate in which a time delay is taken into consideration is referred to as a "filter processing steering angle standard yaw rate ωstf". In Embodiment 3, the steering angle standard yaw rate ωstn constitutes a steering angle yaw rate reference value, and the filter processing steering angle standard yaw rate ωstf constitutes a delayed steering angle yaw rate value.

Figure 13:
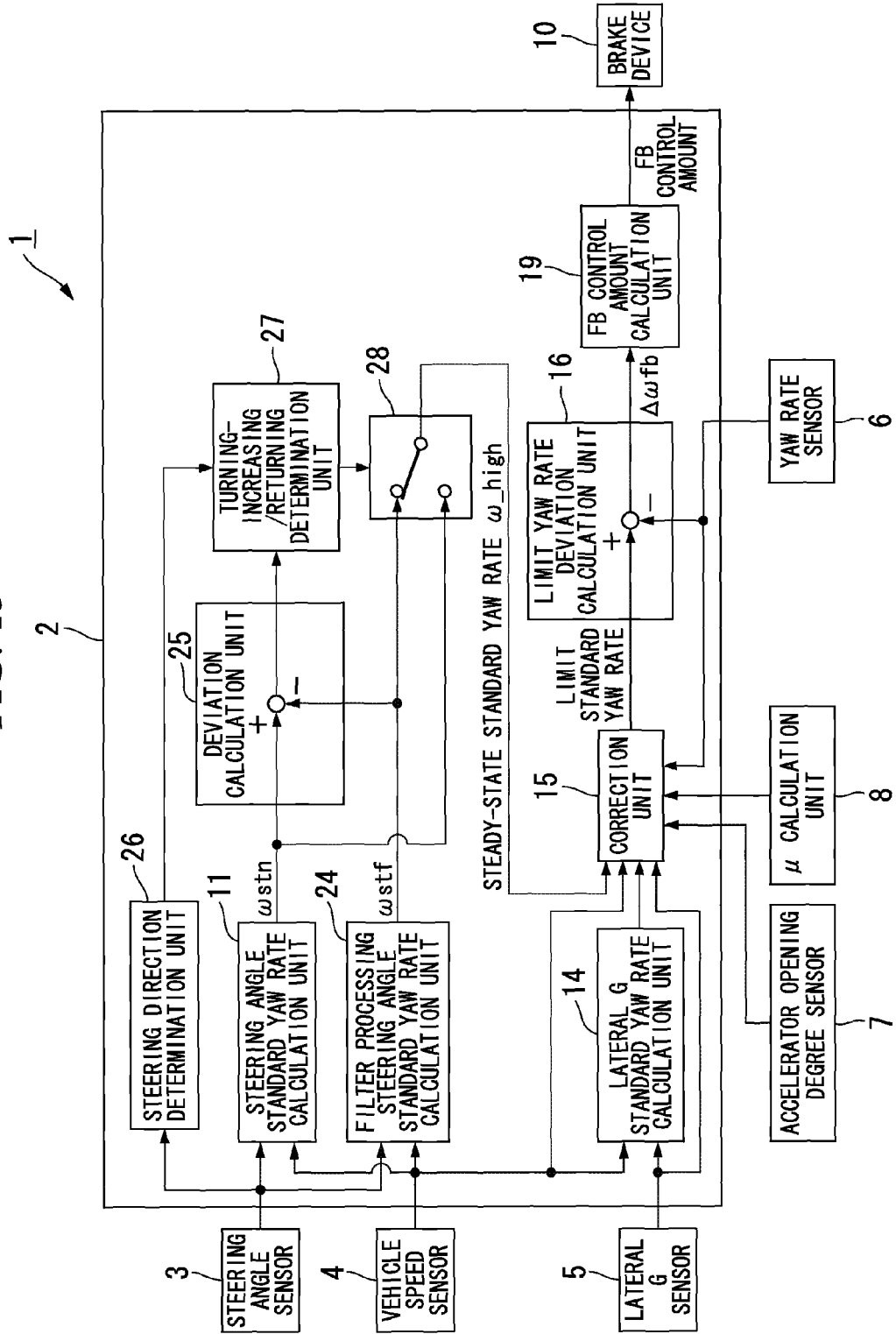
FIG. 13 is a control block diagram in Embodiment 3 of the turning control device for a vehicle related to the invention.

FIG. 13 is a control block diagram in the turning control device for a vehicle of Embodiment 3.

The brake control unit 2 in Embodiment 3 includes the steering angle standard yaw rate calculation unit 11, a filter processing steering angle standard yaw rate calculation unit 24, a steering angle standard yaw rate deviation calculation unit 25, a steering direction determination unit 26, a turning-increasing/returning determination unit 27, a selector 28, the lateral G standard yaw rate calculation unit 14, the correction unit 15, the limit yaw rate deviation calculation unit 16, and the FB control amount calculation unit 19.

Detection signals according to respective detection values are input to the brake control unit 2 from the steering angle sensor 3, the vehicle speed sensor 4, the lateral G sensor 5, the yaw rate sensor 6, and the accelerator opening degree sensor 7. Additionally, an electrical signal according to the frictional coefficient calculated from the μ calculation unit 8 is input to the brake control unit 2.

The steering angle standard yaw rate calculation unit 11, similar to the case of Embodiment 1, estimates and calculates the steering angle standard yaw rate ωstn on the basis of the steering angle detected by the steering angle sensor 3 and the vehicle speed detected by the vehicle speed sensor 4.

The filter processing steering angle standard yaw rate calculation unit 24 calculates the filter processing steering angle standard yaw rate ωstf by performing the time delay processing on the steering angle standard yaw rate ωstn, using the phase lag filter 23 as mentioned above.

The steering angle standard yaw rate deviation calculation unit 25 subtracts the filter processing steering angle standard yaw rate ωstf which is calculated by the filter processing steering angle standard yaw rate calculation unit 24 from the steering angle standard yaw rate ωstn which is calculated by the steering angle standard yaw rate calculation unit 11, thereby calculates a steering angle standard yaw rate deviation.

The steering direction determination unit 26 determines whether the steering wheel is in a state (for example, this state is defined as "+" determination) where the steering wheel is rotated further to the right turn side than the neutral position (straight-ahead direction position) or whether the steering wheel is in a state (for example, this state is defined as "−" determination) where the steering wheel is rotated further to the left turn side, on the basis of the detection value of the steering angle sensor 3.

The turning-increasing/returning determination unit 27 determines whether the steering wheel is increased in turning or returned on the basis of the positive/negative sign of the steering angle standard yaw rate deviation calculated by the steering angle standard yaw rate deviation calculation unit 25, and the determination result of the steering direction determination unit 26.

Figure 14:
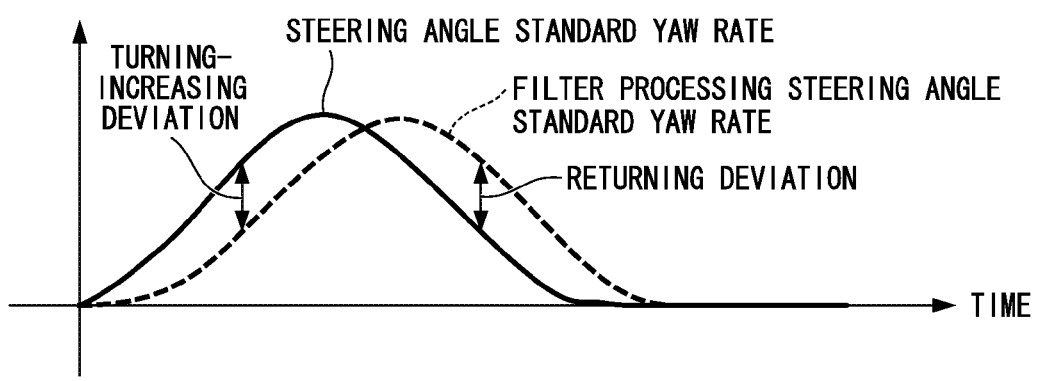
FIG. 14 is a view showing the correlation between a steering angle standard yaw rate and a filter processing steering angle standard yaw rate.

This determination principle will be described with reference to the drawing of FIG. 14. FIG. 14 shows time changes in the steering angle standard yaw rate ωstn and the filter processing steering angle standard yaw rate ωstf when the operation of returning the steering wheel to the neutral position after the steering wheel is turned to the right. Since the filter processing steering angle standard yaw rate ωstf is obtained by taking a time delay into consideration in the steering angle standard yaw rate ωstn, the steering angle standard yaw rate ωstn is larger than the filter processing steering angle standard yaw rate ωstf until a predetermined time passes. However, if the predetermined time passes, the filter processing steering angle standard yaw rate ωstf becomes larger than the steering angle standard yaw rate ωstn contrary to the above.

Here, if the steering angle standard yaw rate ωstn is larger than the filter processing steering angle standard yaw rate ωstf, it can be estimated that the steering wheel is increased in turning, and if the filter processing steering angle standard yaw rate ωstf is larger than the steering angle standard yaw rate ωstn, it can be estimated that the steering wheel is returned. Accordingly, a state (determination using the steering direction determination unit 26 is "+") where the steering wheel is rotated further to the right turn side than the neutral position, and a turning-increasing state can be estimated in a case where the yaw rate deviation calculated by the steering angle standard yaw rate deviation calculation unit 25 is a positive value, and a returning state can be estimated in a case where the yaw rate deviation is a negative value. In addition, in a state where the steering wheel is rotated to the left turn side, estimation can be made on the same principle simply by reversing a sign. That is, turning-increasing can be estimated in a case where the positive/negative sign of the determination result of the steering direction determination unit 26 and the positive/negative sign of the yaw rate deviation calculated by the steering angle standard yaw rate deviation calculation unit 25 are the same, and returning can be determined in a case where the signs are different.

The selector 28 selects one of the steering angle standard yaw rate ωstn calculated by the steering angle standard yaw rate calculation unit 11 and the filter processing steering angle standard yaw rate ωstf calculated by the filter processing steering angle standard yaw rate calculation unit 24 according to the determination result of the turning-increasing/returning determination unit 27, and outputs the selected one to the correction unit 15 as the steady-state standard yaw rate ω_high. In detail, in a case where it is determined to be turning-increasing by the turning-increasing/returning determination unit 27, the filter processing steering angle standard yaw rate ωstf is selected, and the filter processing steering angle standard yaw rate ωstf is output to the correction unit 15 as the steady-state standard yaw rate ω_high. In a case where it is determined to be returning by the turning-increasing/returning determination unit 27, the steering angle standard yaw rate ωstn is selected, and the steering angle standard yaw rate ωstn is output to the correction unit 15 as the steady-state standard yaw rate ω_high.

Since the lateral G standard yaw rate calculation unit 14 is the same as that in Embodiment 1, the description thereof is omitted.

The correction unit 15 calculates the limit standard yaw rate ω_TAR on the basis of the steady-state standard yaw rate ω_high which is input via the selector 28 and the lateral G standard yaw rate ω_low which is input from the lateral G standard yaw rate calculation unit 14. When the limit standard yaw rate ω_TAR is calculated in this correction unit 15, Embodiment 3 is different from Embodiment 1 in that the filter processing steering angle standard yaw rate ωstf is used as the steady-state standard yaw rate ω_high in the case of turning-increasing determination, and the steering angle standard yaw rate ωstn is used as the steady-state standard yaw rate ω_high in the case of returning determination. Except for this point, since the calculation method of the limit standard yaw rate ω_TAR is the same as that of Embodiment 1, the detailed description thereof is omitted.

Since the limit yaw rate deviation calculation unit 16 and the FB control amount calculation unit 19 are the same as those of Embodiment 1, the description thereof is omitted.

Figure 15:
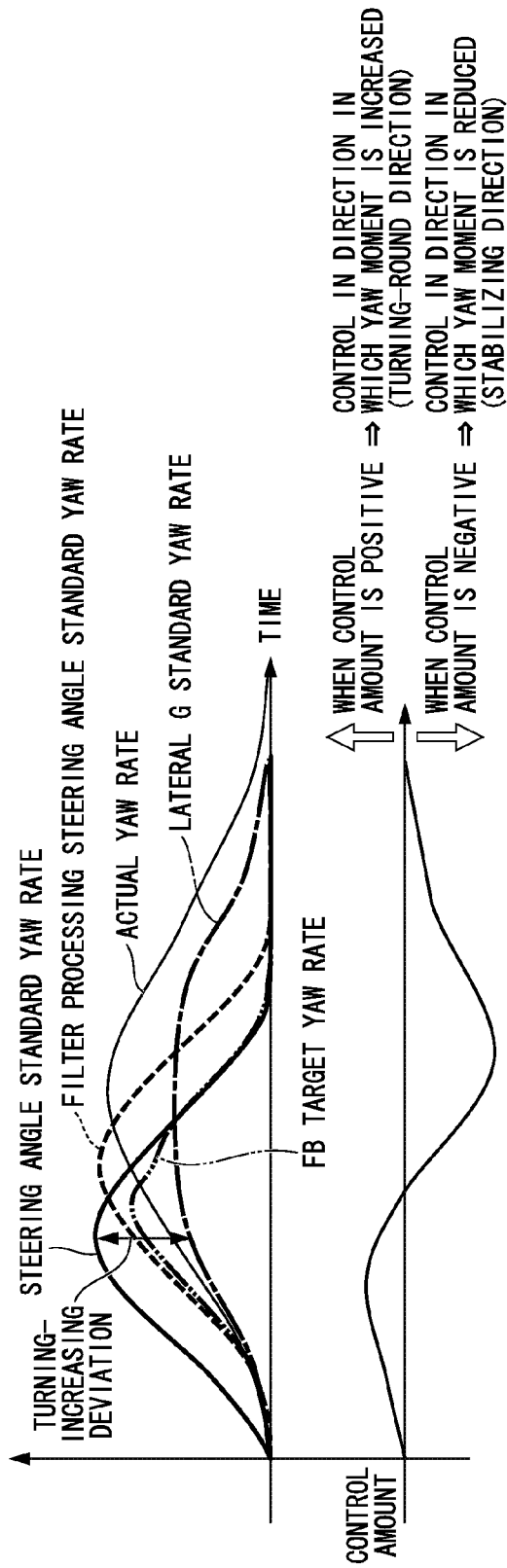
FIG. 15 is a view describing the relationship among a lateral G standard yaw rate, a steering angle standard yaw rate, a filter processing steering angle standard yaw rate, and a feedback target yaw rate.

FIG. 15 shows an example of control results in the turning control device 1 for a vehicle of Embodiment 3, and shows the time shift of respective yaw rate values.

According to the turning control device for a vehicle of Embodiment 3, when the steering wheel is increased in turn, a feedback target yaw rate (hereinafter referred to as an FB target yaw rate) can be set so as to be brought close to the filter processing steering angle standard yaw rate ωstf, and the FB target yaw rate can be set so as to be brought close to the steering angle standard yaw rate ωstn when the steering wheel is returned. Generally, since a driver tends to excessively manipulate the steering wheel while turning-increasing is performed, if the FB target yaw rate is set so as to be brought close to the filter processing steering angle standard yaw rate ωstf whose value is smaller than the steering angle standard yaw rate ωstn, excessive control intervention can be suppressed, and approach to a natural control response can be made. On the other hand, when the steering wheel is returned, response can be improved by setting the FB target yaw rate so as to be brought close to the steering angle standard yaw rate ωstn without a time delay.

Additionally, in the turning control device for a vehicle of Embodiment 3, similar to the turning control device for a vehicle of Embodiment 1, the correction unit 15 corrects the lateral G standard yaw rate ω_low in the increasing direction in association with the steady-state standard yaw rate ω_high (that is, the steering angle standard yaw rate ωstn or the filter processing steering angle standard yaw rate ωstf) calculated on the basis of the steering angle, and calculates the standard yaw rate ω_TAR. Accordingly, the control of stabilizing a yaw moment generated in the vehicle body and the control of improving the response of steering can be made compatible. As a result, a driver's turning intention is reflected with high response, and the sense of steering is improved.

Additionally, similar to the turning control device for a vehicle of Embodiment 1, the lateral G standard yaw rate ω_low is corrected in the increasing direction so as to be used as the limit standard yaw rate ω_TAR, the target value in the FB control amount calculation unit 19 can be increased, and the turning-round property is improved. This enables the vehicle to be turned along a traveling road, and consequently, the road surface following performance (tracking performance) is improved.

Embodiment 4

Next, Embodiment 4 of the turning control device for a vehicle related to the invention will be described with reference to the drawings of FIGS. 16 to 19.

Figure 16:
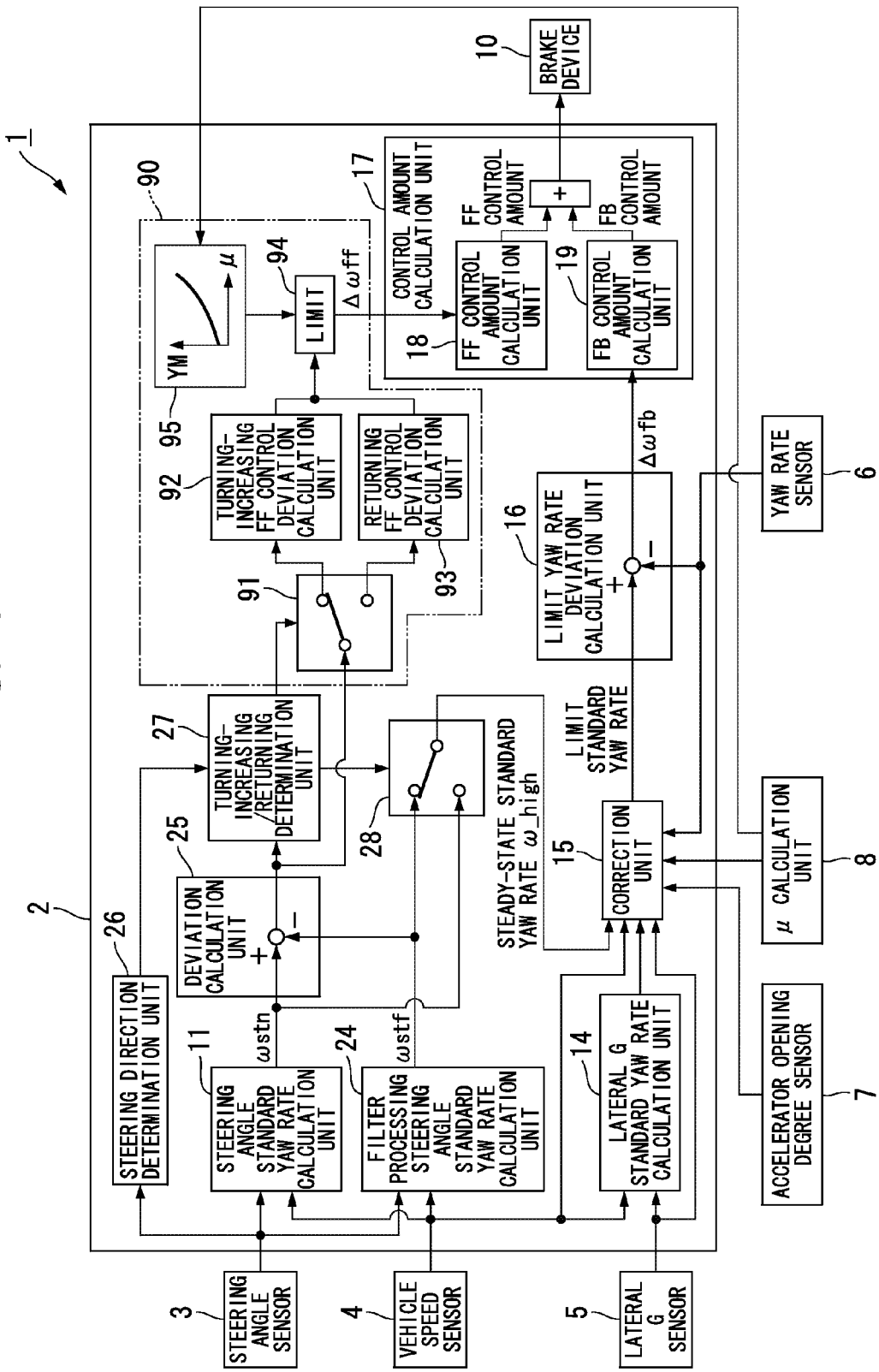
FIG. 16 is a control block diagram in Embodiment 4 of the turning control device for a vehicle related to the invention.

FIG. 16 is a control block diagram in the turning control device for a vehicle of Embodiment 4. In the turning control device for a vehicle of Embodiment 3 mentioned above, the control amount (FB control amount) is obtained in a direction in which the deviation (that is, the limit yaw rate deviation Δωfb) between the limit standard yaw rate ω_TAR and the actual yaw rate is cancelled out so that control braking pressure is controlled using only this FB control amount. However, in the turning control device of Embodiment 4, FF control amount is calculated on the basis of the steering angle and the vehicle speed, a value obtained by adding the FB control amount and the FF control amount is used as a total control amount, and the braking pressure of each wheel is controlled on the basis of this total control amount.

Although the turning control device for a vehicle of Embodiment 4 will be described below, in the control block diagram of FIG. 16, the feedback control system, that is, the steering angle standard yaw rate calculation unit 11, the filter processing steering angle standard yaw rate calculation unit 24, the steering angle standard yaw rate deviation calculation unit 25, the steering direction determination unit 26, the turning-increasing/returning determination unit 27, the selector 28, the lateral G standard yaw rate calculation unit 14, the correction unit 15, and the limit yaw rate deviation calculation unit 16, and the FB control amount calculation unit 19 are the same as those of Embodiment 3. Thus, the same aspect portions will be designated by the same reference numerals, and the description thereof will be omitted, and the feedforward control system that is different from Embodiment 3 will mainly be described.

The turning control device 1 for a vehicle in Embodiment 4 includes a feedforward control deviation calculation unit (hereinafter abbreviated as an FF control deviation calculation unit) 90 and the FF control amount calculation unit 18, as a feedforward control system, in addition to the configuration of the turning control device 1 for a vehicle of Embodiment 3. The control amount calculation unit 17 is constituted by the FF control amount calculation unit 18 and the FB control amount calculation unit 19 in Embodiment 1.

The FF control deviation calculation unit 90 includes a selector 91, a turning-increasing FF control deviation calculation unit 92, a returning FF control deviation calculation unit 93, a limit-processing unit 94, and a limit value table 95.

The selector 91 selects whether steering angle standard yaw rate deviation calculated by the steering angle standard yaw rate deviation calculation unit 25 is output to any of the turning-increasing FF control deviation calculation unit 92 and the returning FF control deviation calculation unit 93, according to the determination result of the turning-increasing/returning determination unit 27. In detail, in a case where it is determined to be turning-increasing by the turning-increasing/returning determination unit 27, the steering angle standard yaw rate deviation calculated by the steering angle standard yaw rate deviation calculation unit 25 is output to the turning-increasing FF control deviation calculation unit 92. In a case where it is determined to be returning by the turning-increasing/returning determination unit 27, the steering angle standard yaw rate deviation calculated by the steering angle standard yaw rate deviation calculation unit 25 is output to the returning FF control deviation calculation unit 93.

The turning-increasing FF control deviation calculation unit 92 and the returning FF control deviation calculation unit 93 multiplies the steering angle standard yaw rate deviation (ωstn−ωstf) which is input via the selector 91 from the steering angle standard yaw rate deviation calculation unit 25 by a gain Kg which is according to the lateral G and the gain Kv which is according to the vehicle speed, thereby calculating an FF control deviation. Here, the gains Kg and Kv are calculated with reference to a lateral G gain table and a vehicle speed gain table, respectively. At this time, the lateral G gain table and the vehicle speed gain table to be used in the turning-increasing FF control deviation calculation unit 92 and the returning FF control deviation calculation unit 93 differ from each other.

Figure 17:
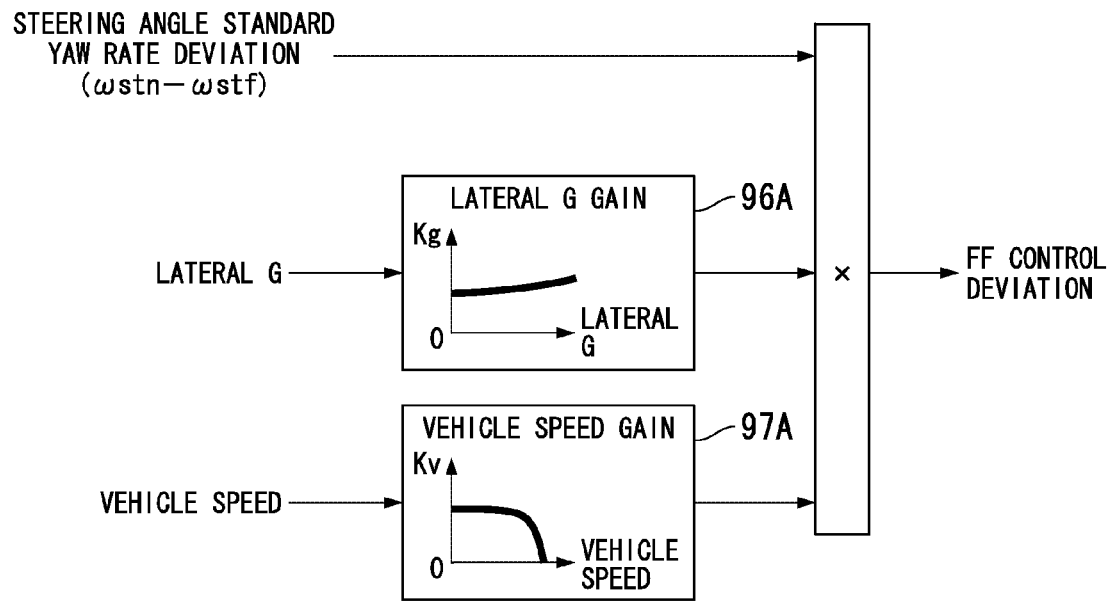
FIG. 17 is a block diagram of turning-increasing FF control deviation calculation in Embodiment 4.
Figure 18:
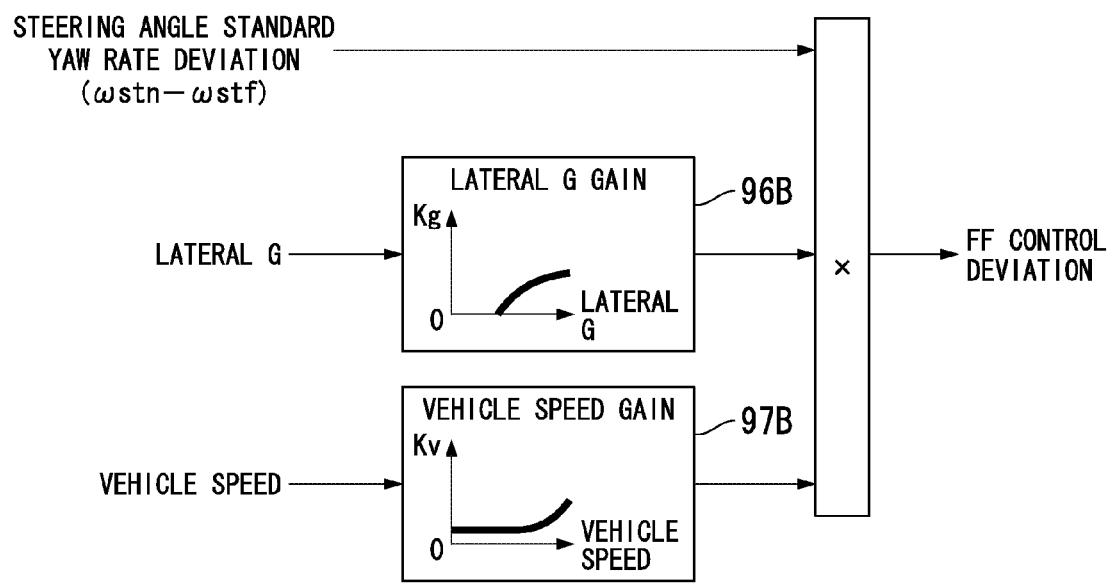
FIG. 18 is a block diagram of returning FF control deviation calculation in Embodiment 4.

FIG. 17 is a control block diagram of the turning-increasing FF control deviation calculation unit 92, and FIG. 18 is a control block diagram of the returning FF control deviation calculation unit 93. In the lateral G gain tables 96A and 96B, the horizontal axis represents the lateral G and the vertical axis represents the gain Kg. In the vehicle speed gain tables 97A and 97B, the horizontal axis represents the vehicle speed and the vertical axis represents the gain Kv.

First, the calculation of the FF control deviation in the turning-increasing FF control deviation calculation unit 92 will be described with reference to FIG. 17.

In the lateral G gain table 96A in the turning-increasing FF control deviation calculation unit 92, the gain Kg is a predetermined positive value when the lateral G is 0, and the gain Kg becomes slightly gradually larger as the lateral G becomes larger. The turning-increasing FF control deviation calculation unit 92 calculates the gain Kg according to the lateral G detected by the lateral G sensor 5 with reference to the lateral G gain table 96A.

In the vehicle speed gain table 97A in the turning-increasing FF control deviation calculation unit 92, the gain Kv is a positive value which is almost constant until the vehicle speed reaches a predetermined vehicle speed, and the gain decreases abruptly and becomes 0 if the vehicle speed exceeds the predetermined vehicle speed. The turning-increasing FF control deviation calculation unit 92 calculates the gain Kv according to the vehicle speed detected by the vehicle speed sensor 4 with reference to the vehicle speed gain table 97A.

The turning-increasing FF control deviation calculation unit 92 multiplies the steering angle standard yaw rate deviation (ωstn−ωstf) by the gain Kg and the gain Kv, thereby calculating the FF control deviation.

That is, in Embodiment 4, the FF control deviation in a case where it is determined to be turning-increasing depends greatly on the vehicle speed. Although the FF control deviation is set to an appropriate value in a steady-state vehicle speed region until the vehicle speed exceeds the predetermined vehicle speed, the FF control deviation becomes almost 0 in a high vehicle speed region where the vehicle speed exceeds the predetermined vehicle speed.

Next, the calculation of the FF control deviation in the returning FF control deviation calculation unit 93 will be described with reference to FIG. 18.

In the lateral G gain table 96B in the returning FF control deviation calculation unit 93, the gain Kg is 0 until the lateral G reaches a predetermined value, and the gain Kg becomes gradually larger as the lateral G becomes larger if the lateral G exceeds the predetermined value. The returning FF control deviation calculation unit 93 calculates the gain Kg according to the lateral G detected by the lateral G sensor 5 with reference to the lateral G gain table 96B.

In the vehicle speed gain table 97B in the returning FF control deviation calculation unit 93, the gain Kv is a positive value which is almost constant until the vehicle speed reaches a predetermined vehicle speed, and the gain increases gradually if the vehicle speed exceeds the predetermined vehicle speed. The returning FF control deviation calculation unit 93 calculates the gain Kv according to the vehicle speed detected by the vehicle speed sensor 4 with reference to the vehicle speed gain table 97B.

The returning FF control deviation calculation unit 93 multiplies the steering angle standard yaw rate deviation (ωstn−ωstf) by the gain Kg and the gain Kv, thereby calculating the FF control deviation.

That is, in Embodiment 4, the FF control deviation in a case where it is determined to be returning depends greatly on the lateral G. The FF control deviation is 0 irrespective of the vehicle speed if the lateral G is equal to or lower than the predetermined value. An FF control deviation occurs if the lateral G exceeds the predetermined value.

In this embodiment, the lateral G gain table 96A and the vehicle speed gain table 97A constitute increase characteristics at turning-increasing determination, and the lateral G gain table 96B and the vehicle speed gain table 97B constitute increase characteristics at returning determination.

As such, in the FF control deviation calculation unit 90, the FF control deviation is calculated by changing increase characteristics (in other words, shifting the increase characteristics) according to the determination result of the turning-increasing/returning determination unit 27.

Since the increase characteristics in the respective cases of turning-increasing and returning are set as mentioned above, the FF control deviation at the turning-increasing becomes 0 in the high vehicle speed region, and becomes smaller than the FF control deviation at the returning. This can suppress excessive steering intervention at the turning-increasing in the high vehicle speed region to secure stability and improve convergence performance. On the other hand, a response can be improved at the returning in the high vehicle speed region.

The turning-increasing FF control deviation calculation unit 92 and the returning FF control deviation calculation unit 93 outputs the calculated FF control deviation to the limit-processing unit 94.

A limit value YM determined with reference to the limit value table 95 is input to the limit-processing unit 94, in addition to the FF control deviation. In the limit value table 95, the horizontal axis represents the frictional coefficient μ of a road surface and the vertical axis represents the limit value YM. The limit value YM is determined according to the frictional coefficient μ of a road surface calculated by the μ calculation unit 8.

The limit-processing unit 94 performs limit processing so that the FF control deviation, which is input from the turning-increasing FF control deviation calculation unit 92 or the returning FF control deviation calculation unit 93, does not exceed the limit value (upper limit value) YM determined in the limit value table 95. That is, the limit-processing unit 94 outputs the calculated FF control deviation as it is in a case where the FF control deviation calculated by the turning-increasing FF control deviation calculation unit 92 or the returning FF control deviation calculation unit 93 does not exceed the limit value YM, and outputs the limit value YM as the FF control deviation in a case where the FF control deviation calculated by the turning-increasing FF control deviation calculation unit 92 or the returning FF control deviation calculation unit 93 exceeds the limit value YM.

The FF control deviation output from the limit-processing unit 94 is input to the FF control amount calculation unit 18 as the steady-state yaw rate deviation $\Delta\omega$ff.

The FF control amount calculation unit 18 calculates the FF control amount on the basis of the steady-state yaw rate deviation $\Delta\omega$ff (that is, the FF control deviation output from the limit-processing unit 94) which is input from the FF control deviation calculation unit 90.

Figure 11:
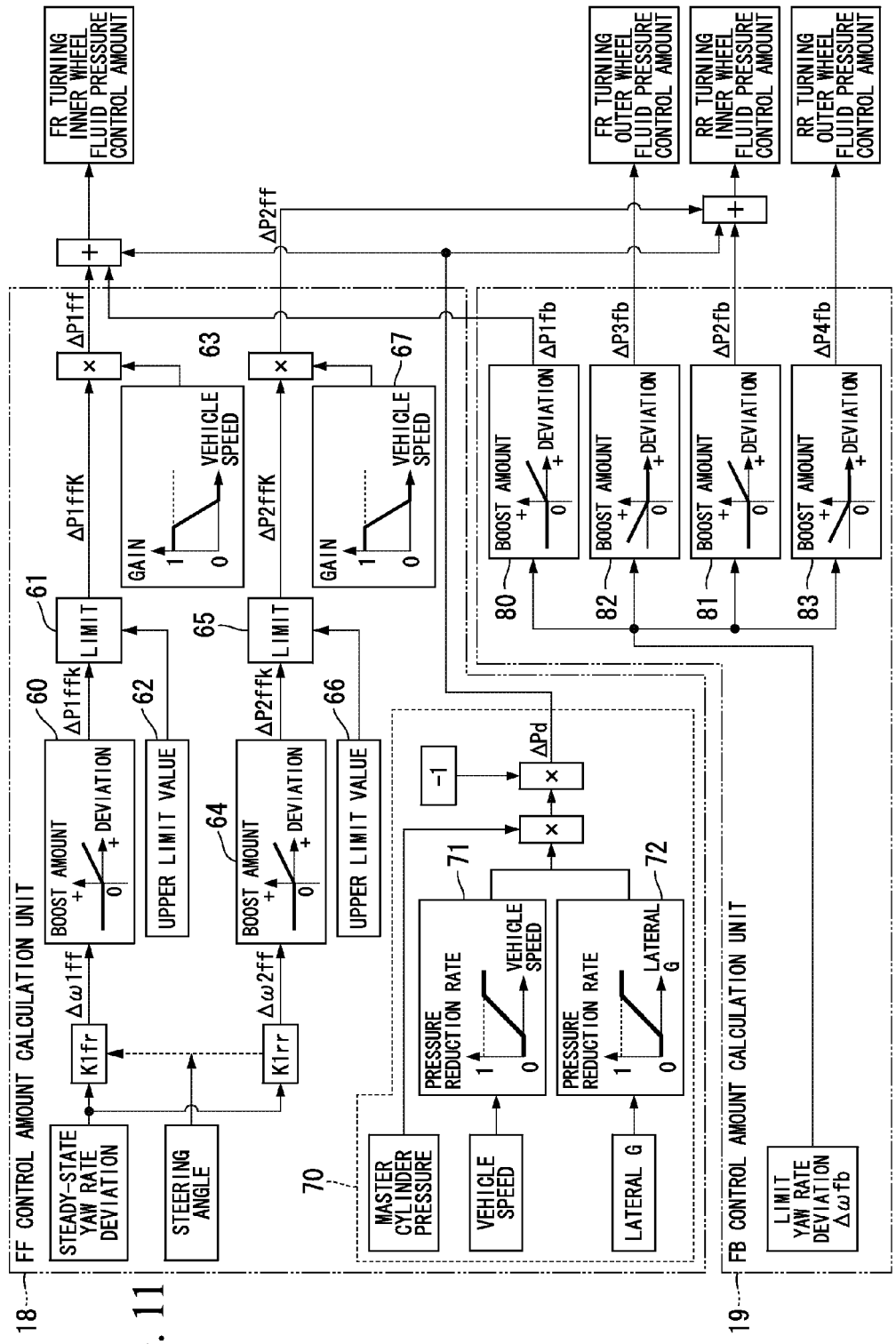
FIG. 11 is a block diagram of braking force control amount calculation in Embodiment 2.

In addition, since the FF control amount calculation processing of the FF control amount calculation unit 18 in Embodiment 4 is completely the same as the FF control amount calculation processing of the FF control amount calculation unit 18 in Embodiment 2 except for using the FF control deviation as the steady-state yaw rate deviation $\Delta\omega$ff, the description thereof is omitted by incorporating FIG. 11 herein.

Additionally, since the calculation of the FB control amount in the FB control amount calculation unit 19 is the same as that of Embodiment 3, the description thereof is omitted.

The control amount calculation unit 17 calculates a total control amount by adding the FF control amount calculated by the FF control amount calculation unit 18 and the FB control amount calculated by the FB control amount calculation unit 19, and outputs the total control amount to the brake device 10 as a command value. Since the calculation processing of the total control amount is the same as Embodiment 2, the description thereof is omitted by incorporating FIG. 11.

Figure 19:
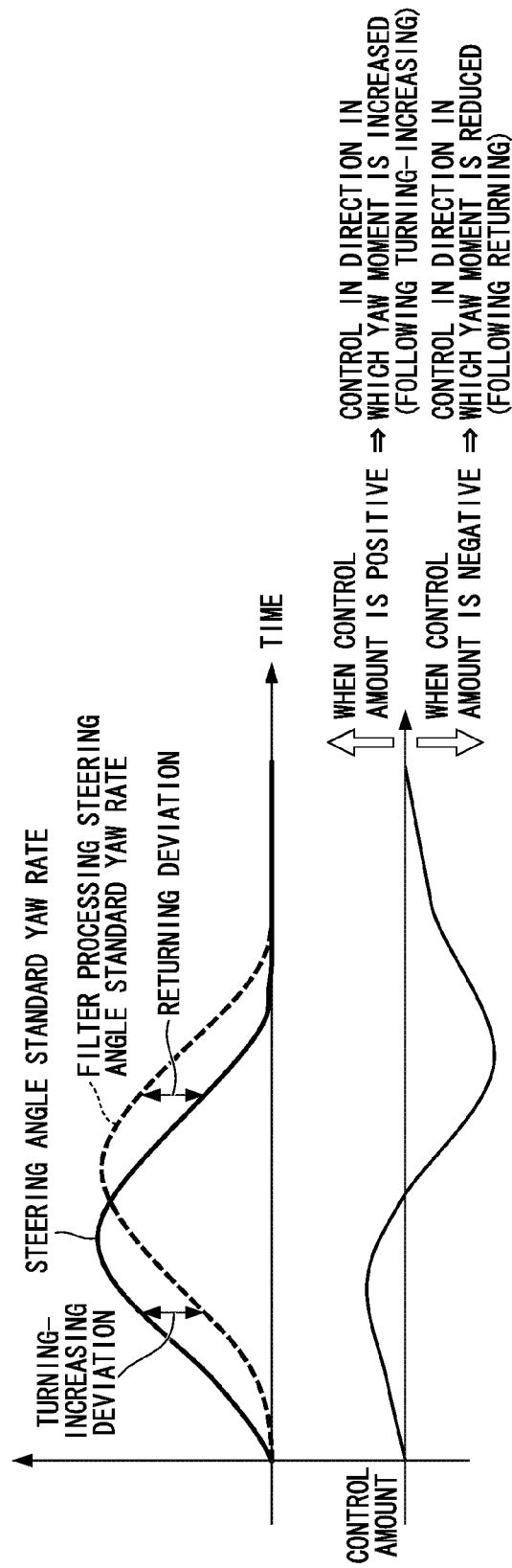
FIG. 19 is a view describing feedforward control in Embodiment 4.

FIG. 19 is a conceptual diagram of the FF control in the turning control device for a vehicle of Embodiment 4.

According to the turning control device for a vehicle of Embodiment 4, control can be made in the direction in which the total control amount is increased (in other words, in the direction in which the yaw moment is increased) at the turning-increasing, and control can be made in the direction in which the total control amount is reduced at the returning (in other words, in the direction the yaw moment is reduced).

Moreover, as mentioned above, even at the turning-increasing, the FF control deviation is set to an appropriate value in the steady-state vehicle speed region until the vehicle speed exceeds a predetermined vehicle speed. However, since the FF control deviation is set so as to become 0 in the high vehicle speed region where the vehicle speed exceeds the predetermined vehicle speed, a time delay can be reduced and the response of steering can be improved by carrying out the FF control in the direction in which the yaw moment is increased only in the steady-state speed region, and the stability of steering can be secured without performing the FF control in the direction in which the yaw moment is increased in the high vehicle speed region.

Additionally, since control can be made in the direction in which the total control amount is reduced at the returning (in other words, in the direction in which the yaw moment is reduced), the convergence performance of the yaw moment is improved. In addition, since the FF control deviation is set to become 0 when the lateral G is small at the returning as mentioned above, the FF control in the direction in which the yaw moment is reduced is not carried out at this time. This is for preventing the vehicle behavior from becoming unnatural due to control intervention and smoothly returning the steering wheel to the neutral position without any discomfort, using the self-convergence performance of the vehicle.

Additionally, according to the turning control device for a vehicle of Embodiment 4, similar to the case of Embodiment 1, the correction unit 15 corrects the lateral G standard yaw rate $\omega\_low$ in the increasing direction in association with the steady-state standard yaw rate $\omega\_high$ (that is, the steering angle standard yaw rate $\omega stn$ or the filter processing steering angle standard yaw rate $\omega stf$) calculated on the basis of the steering angle, and calculates the standard yaw rate $\omega\_TAR$. Thus, the control of stabilizing a yaw moment generated in the vehicle body and the control of improving the response of steering can be made compatible. As a result, a driver's turning intention is reflected with high response, and the sense of steering is improved.

Additionally, the lateral G standard yaw rate $\omega\_low$ is corrected in the increasing direction so as to be used as the limit standard yaw rate $\omega\_TAR$, the target value in the FB control amount calculation unit 19 can be increased, and the turning-round property is improved. This enables the vehicle to be turned along a traveling road, and consequently, the road surface following performance (tracking performance) is improved.

Moreover, according to the turning control device for a vehicle of Embodiment 4, braking pressure is controlled on the basis of the total control amount obtained by adding the FF control amount calculated on the basis of a steering input to the FB control amount which is calculated on the basis of the body behavior. Thus, the response of steering can be improved while securing the stability of the vehicle behavior. Additionally, the followability of steering is also improved. For example, in the process of steering holding after a steering input, like during steady-state circle turning, a change in the control amount is suppressed and the followability is improved.

Other Embodiments

In addition, the invention is not limited to the aforementioned embodiments.

For example, although the total control amount is calculated by adding the FF control amount and the FB control amount in the aforementioned Embodiments 2 and 4, it is also possible to multiply the FF control amount and the FB control amount to calculate the total control amount.

Additionally, an estimated vehicle speed estimated on the basis of the detection value of a vehicle wheel speed sensor may be used instead of the detection value of the vehicle speed sensor.

Additionally, in the aforementioned Embodiments 2 and 4, in the FF control amount calculation unit 18, the FF boost amount $\Delta P1 \mathit{ff}$ of the FR turning inner wheel and the FF boost amount $\Delta P2 \mathit{ff}$ of the RR turning inner wheel at a high vehicle speed are invalidated to prevent the vehicle behavior from becoming unstable due to steering-assisted braking at the high vehicle speed. On the other hand, the FF boost amount of the turning inner wheel may also be invalidated even when the steering speed is very high or at an ABS operation.

INDUSTRIAL APPLICABILITY

According to the turning control device for a vehicle related to one aspect of the invention, the second standard yaw rate is calculated by correcting the first standard yaw rate calculated on the basis of the lateral acceleration and the vehicle speed in the increasing direction, and a braking force is controlled so that a yaw moment can be generated in the direction in which the yaw rate deviation between the second standard yaw rate and an actual yaw rate is cancelled out. For this reason, even at usual turning, the turning-round property is improved and the response of steering is improved.

REFERENCE SIGNS LIST

1: TURNING CONTROL DEVICE FOR VEHICLE
3: STEERING ANGLE SENSOR (STEERING AMOUNT DETECTION UNIT)
4: VEHICLE SPEED SENSOR (VEHICLE SPEED DETECTION UNIT)
5: LATERAL G SENSOR (LATERAL ACCELERATION DETECTION UNIT)
6: YAW RATE SENSOR (YAW RATE DETECTION UNIT)
7: ACCELERATOR OPENING DEGREE SENSOR (REQUIRED TORQUE DETECTION UNIT)
10: BRAKE DEVICE (BRAKING CONTROL UNIT)
14: LATERAL G STANDARD YAW RATE CALCULATION UNIT (FIRST STANDARD YAW RATE CALCULATION UNIT)
15: CORRECTION UNIT
18: FF CONTROL AMOUNT CALCULATION UNIT (SECOND BRAKING FORCE CONTROL AMOUNT CALCULATION UNIT)

19: FB CONTROL AMOUNT CALCULATION UNIT (BRAKING FORCE CONTROL AMOUNT CALCULATION UNIT)

63, 67 GAIN TABLE (INVALIDATION SECTION)

The invention claimed is:

1. A turning control device for a vehicle which generates a yaw moment in a vehicle body by giving a braking force to each of right and left wheels on the basis of a traveling state of the vehicle, the turning control device for the vehicle comprising: a brake control unit which determines a braking force control amount to be applied to each wheel of a vehicle based on input from:
a steering angle sensor that detects a steering amount of the vehicle;
a vehicle speed sensor that detects or estimates a vehicle speed of the vehicle;
a lateral acceleration sensor that detects an acceleration of the vehicle in a right-and-left direction;
a yaw rate sensor that detects an actual yaw rate of the vehicle;
and the brake control unit calculates:
a first standard yaw rate based on input from the lateral acceleration sensor and the vehicle speed sensor;
a steady-state standard yaw rate based on input of the steering angle sensor input and vehicle speed sensor input and the first standard yaw rate;
a reference limit standard yaw rate based on the steady-state standard yaw rate, a distribution coefficient, and the first standard yaw rate;
a second standard yaw rate;
a limit yaw rate deviation by subtracting the actual yaw rate from the second standard yaw rate;
correction coefficients HS1, HS2 and HS3;
wherein correction coefficient HS1 is obtained by multiplying a correction coefficient based on steering speed by a correction coefficient based on front load of a vehicle;
wherein correction coefficient HS2 is based on input from a friction calculation unit that calculates a friction coefficient between a vehicle wheel and a road surface, based on input from a steering angle sensor input, actual yaw rate sensor input, and acceleration sensor input;
wherein correction coefficient HS3 is obtained based on input from the vehicle speed sensor and one of a vehicle torque sensor and the lateral acceleration sensor, and HS3=0 when torque exceeds a predetermined value T0 and HS3>0 when torque is <a predetermined value T0; and
wherein the second standard yaw rate is calculated by multiplying the reference limit standard yaw rate by correction coefficients HS1 and HS2, and adding correction coefficient HS3, and the second standard yaw rate is used as a target value in feedback control; and
the brake control unit determines a braking force control amount of each wheel so as to cancel out the limit yaw rate deviation; and
determines a correction amount so that the second standard yaw rate becomes smaller as the vehicle speed becomes larger.

2. The turning control device for a vehicle according to claim 1, wherein the brake control unit calculates the magnitude of a required torque based on input from an accelerator opening sensor, and calculates and communicates a correction amount so that the second standard yaw rate becomes larger as the vehicle speed becomes smaller when the detection signal of the required torque detection unit is smaller than a predetermined value.

3. The turning control device for a vehicle according to claim 1, wherein the brake control unit calculates a correction amount so that the second standard yaw rate increases as a turning speed or turning amount calculated on the basis of the input from the steering sensor becomes larger.

4. The turning control device for a vehicle according to claim 1, wherein the brake control unit calculates a second braking force control amount based on input from the steering sensor and the vehicle speed sensor, and obtains a total braking force control amount by adding or multiplying the braking force control amount and the second braking force control amount.

5. The turning control device for a vehicle according to claim 4, wherein the brake control unit invalidates the second braking force control amount in a predetermined operational status.

6. The turning control device for a vehicle according to claim 1, wherein the brake control unit selects a delayed steering angle yaw rate value where a steering direction determined based on input from the steering sensor is a turning-increasing direction, and selects a steering angle yaw rate reference value where the steering direction is a returning direction.

7. A steering control device for a vehicle according to claim 1 wherein the brake control unit further calculates a feedback control amount for each of a turning front inner wheel, a turning front outer wheel, a turning rear inner wheel and a turning rear outer wheel, based on the limit yaw rate deviation.

8. A steering control device for a vehicle according to claim 7 wherein the brake control unit calculates the feedback control amount in a case where the limit yaw rate deviation is >0 so that the feedback control amount of each wheel is set in a direction in which the yaw rate is increased so that the limit yaw rate deviation is cancelled out.

9. A steering control device for a vehicle according to claim 8 wherein the feedback control amount is a boost amount set in a direction in which the brake fluid pressures of the front right and rear right turning inner wheels are increased, and the brake fluid pressures of the front right and rear right turning outer wheels are not increased.

10. A steering control device for a vehicle according to claim 7 wherein the brake control unit calculates the feedback control amount in a case where the limit yaw rate deviation is <0, and the feedback control amount of each wheel is set in a direction in which the yaw rate is decreased.

11. A steering control device according to claim 10 wherein the feedback control amount is a boost amount set in a direction in which the brake fluid pressures of the front right and rear right turning outer wheels are increased, and the and brake fluid pressures of the front right and rear right turning inner wheels are not increased.

12. A steering control device according to claim 1 wherein the brake control unit further calculates a feedforward control deviation by multiplying a steering angle standard yaw rate deviation by a gain Kg determined by lateral acceleration, and a gain Kv determined by vehicle speed, wherein the feedforward control deviation is zero when acceleration is below a set value when steering is in a returning direction, and is zero when vehicle speeds exceed a set value when steering is in a turning increasing direction.

13. A steering control device according to claim 4 wherein the second braking control amount is a feedforward amount calculated based on a steady state yaw rate deviation and is added to a feedback control amount calculated based on the limit yaw rate deviation and the feedback control amount and feedforward amount are added together to equal a total braking control amount.

* * * * *